(12) United States Patent
Leconte et al.

(10) Patent No.: US 12,389,908 B2
(45) Date of Patent: Aug. 19, 2025

(54) FUNGICIDE COMPOSITION FOR CONTROLLING ZYMOSEPTORIA INFECTION IN PLANT

(71) Applicants: UPL Corporation Limited, Port Louis (MU); UPL Europe Limited, Warrington (GB)

(72) Inventors: Florence Pierrette Leconte, Port Louis (MU); Caroline Minvielle, Port Louis (MU); Christophe Charles Corman, Port Louis (MU)

(73) Assignees: UPL CORPORATION LIMITED; UPL EUROPE LTD., Warrington (GB)

( * ) Notice: Subject to any disclaimer, the term of this patent is extended or adjusted under 35 U.S.C. 154(b) by 425 days.

(21) Appl. No.: 17/608,793

(22) PCT Filed: Jun. 5, 2020

(86) PCT No.: PCT/EP2020/065662
§ 371 (c)(1),
(2) Date: Nov. 4, 2021

(87) PCT Pub. No.: WO2020/245384
PCT Pub. Date: Dec. 10, 2020

(65) Prior Publication Data
US 2022/0312765 A1    Oct. 6, 2022

(30) Foreign Application Priority Data
Jun. 5, 2019  (FR) ..................... 1905972

(51) Int. Cl.
*A01N 43/38*    (2006.01)

(52) U.S. Cl.
CPC .................................. *A01N 43/38* (2013.01)

(58) Field of Classification Search
CPC ...................................................... A61N 43/38
See application file for complete search history.

(56) References Cited

U.S. PATENT DOCUMENTS

2010/0331181 A1    12/2010    Groeger et al.

FOREIGN PATENT DOCUMENTS

| CN | 101953346 A | 1/2011 |
| CN | 102150674 A | 8/2011 |
| CN | 102150675 A | 8/2011 |
| CN | 103461362 A * | 12/2013 |

(Continued)

OTHER PUBLICATIONS

International Search Report and Written Opinion for International Application PCT/EP2020/065662: International Filing Date: Jun. 5, 2020; Date of Mailing: Aug. 3, 2020; 19 pages.

(Continued)

*Primary Examiner* — Benjamin J Packard
(74) *Attorney, Agent, or Firm* — CANTOR COLBURN LLP

(57) ABSTRACT

The present invention relates to a fungicide composition comprising a multi-site fungicide for controlling phytopathogenic fungi in plant. The present invention also relates to use of said composition for the controlling fungal infection and a method for the prevention and/or treatment of fungal leaf spot diseases caused by Zymoseptoria infection in plants.

3 Claims, 1 Drawing Sheet

(56) References Cited

FOREIGN PATENT DOCUMENTS

| | | |
|---|---|---|
| CN | 105851045 A | 8/2016 |
| CN | 106172450 A | 12/2016 |
| CN | 106982844 A | 7/2017 |
| CN | 107047584 A | 8/2017 |
| CN | 108184875 A | 6/2018 |
| IN | 105851058 A | 8/2016 |
| JP | H02104506 A | 4/1990 |
| WO | 2005032257 A1 | 4/2005 |
| WO | 2009040397 A1 | 4/2009 |
| WO | 2010146031 A2 | 12/2010 |
| WO | 2011004901 A1 | 1/2011 |
| WO | 2011117868 A1 | 9/2011 |
| WO | 2013133705 A1 | 9/2013 |
| WO | 2013175467 A1 | 11/2013 |
| WO | WO-2014060177 A1 * | 4/2014 ............. A01N 43/42 |
| WO | WO-2017036484 A1 * | 3/2017 ............. A01N 3/00 |
| WO | 2017157910 A1 | 9/2017 |
| WO | 2017162567 A1 | 9/2017 |
| WO | 2018069114 A1 | 4/2018 |
| WO | 2015113838 A1 | 8/2018 |
| WO | 2018162999 A1 | 9/2018 |
| WO | 2018202428 A1 | 11/2018 |
| WO | 2019138145 A1 | 7/2019 |
| WO | 2019186356 A1 | 10/2019 |
| WO | 2019186359 A1 | 10/2019 |

OTHER PUBLICATIONS

Munjal, R. et al.: "Laboratory evaluation of fungicides in controlling Septoria leaf spot of hops", Indian Journal of Mycology and Plant Pathology, vol. 8, Issue No. 2, 1978; p. 204. CODEN: IJMPAK; ISBN: 0303-4097.

* cited by examiner

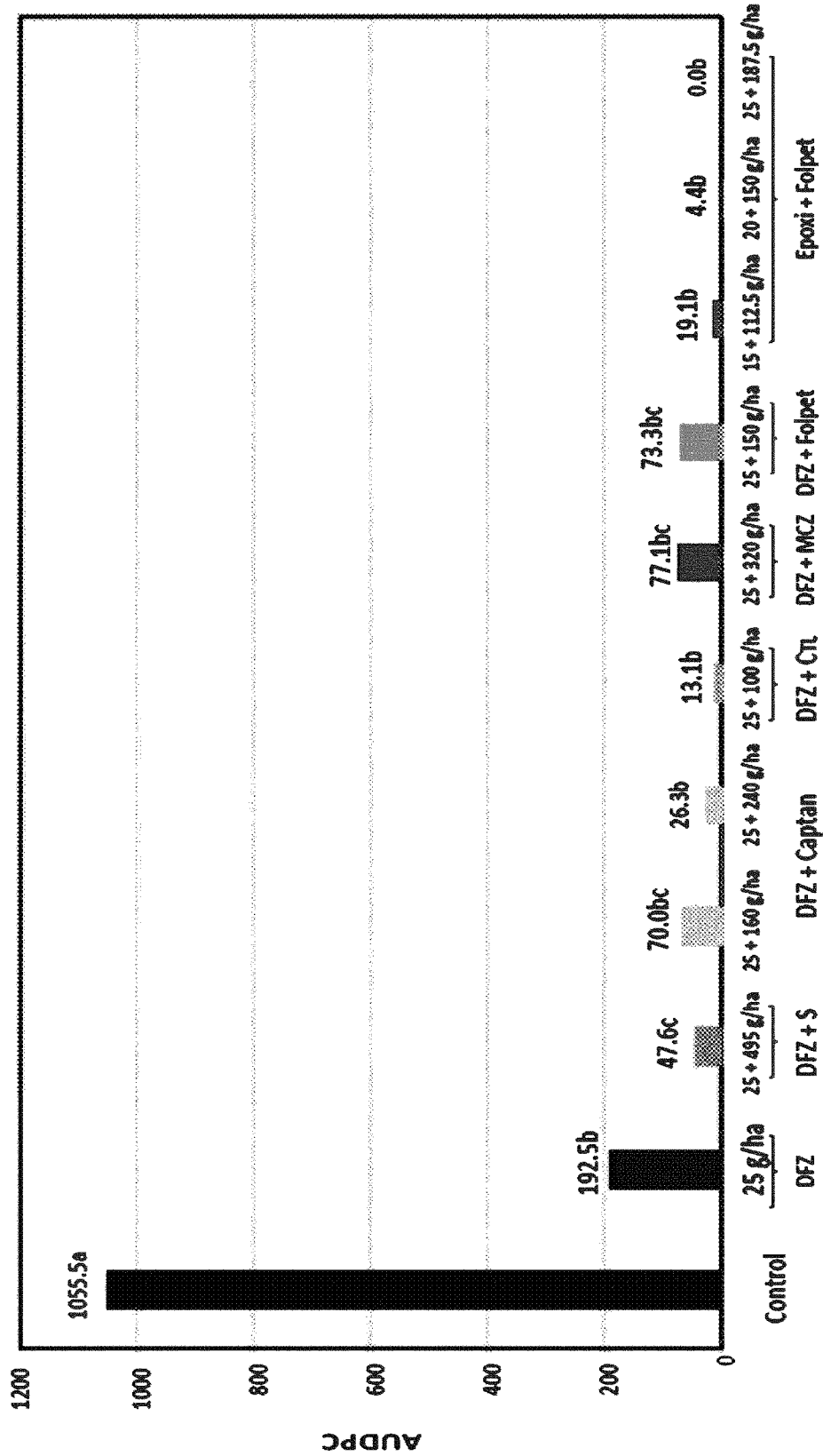

FUNGICIDE COMPOSITION FOR CONTROLLING ZYMOSEPTORIA INFECTION IN PLANT

CROSS REFERENCE TO RELATED APPLICATIONS

This application is a National Stage application of PCT/EP2020/065662, filed Jun. 5, 2020, which claims priority to French Patent Application 1905972, filed Jun. 5, 2019, both of which are incorporated by reference in their entirety herein.

FIELD OF THE INVENTION

The present invention relates to a fungicide composition comprising a multi-site fungicide for controlling phytopathogenic fungi in plant. The present invention also relates to use of said composition for the controlling fungal infection and a method for the prevention and/or treatment of fungal leaf spot diseases caused by Zymoseptoria infection in plants.

BACKGROUND OF THE INVENTION

*Septoria tritici* (taxonomic name: Zymoseptoria *tritici*) is a haploid ascomycete fungus, formerly referred to as Mycosphaerella graminicola. Zymoseptoria *tritici* (*Z. tritici*) is a pathogenic fungus which causes one of the most serious diseases of wheat worldwide, *Septoria tritici* blotch (STB). STB outbreaks can reduce wheat yields by 30-40%, and *Z. tritici* is therefore a major threat to global food security. This pathogen is of particular concern in humid climates such as those found in European countries, where up to an estimated 700-euro million worth of wheat yield is lost annually to STB (Fones and Gurr, 2015). There are no wheat varieties which are fully resistant to this pathogen, and disease control relies heavily on chemical application. However, there are limitation on fungicide usage-reduction according to policies in Europe. In addition, frequent sexual recombination within the pathogen population leads to polymorphisms and the evolution of virulent strains that can overcome host resistance and fungicide tolerance, thus making it very difficult to control. Therefore, there is an urgent need to further understand *Z. tritici* and its interaction with its wheat host in order to provide future control strategies.

Wheat is one of the most intensely produced cereals worldwide, and it accounts for about 21% of the food calories and 20% protein intake for 4.5 billion people (Braun et al., 2010). Crop loss due to pathogens, animals and weeds accounts for 20-40% of yield (Oerke, 2006). Therefore, disease control needs to play a pivotal role in increasing cereal production whilst having a minimal impact on already limited resources such as land and water.

STB is currently controlled heavily using the fungicides. The fungicides which are commonly used to control *Z. tritici* are single-site fungicides such as demethylation inhibitors (DMIs), succinate dehydrogenase inhibitors (SDHIs) and multisite fungicides including chlorothalonil (Torriani et al., 2015). However, development of fungicide resistance remains a concern. Extensive applications of fungicides increase the worldwide economic costs attributed to STB.

Captan is a non-systemic fungicide used to control diseases of many fruit, ornamental, and vegetable crops. It is used in agricultural production as well as by the home gardener. Captan can be used to control plant diseases such as black rot, early and late blight, and downy mildew, among others.

Folpet, a chloroalkylthio compound with broad spectrum protectant fungicide (N-(trichloromethylthio) phth alimide, has been in use for the last several decades. Folpet is predominantly used in agronomic practice along with other industrial applications today.

US2010331181 discloses a method for protecting cereals from being infected by harmful fungi, wherein the cereals, their seed or the soil is treated with a fungicidally effective amount of a synergistically active combination comprising a) bixafen or N-[2-(1,3-dimethylbutyl)-phenyl]-1,3-dimethyl-5-fluor-1H-pyrazole-4-carboxamide and b) epoxiconazole or metconazole.

WO2015113838 disclose a method for controlling *Septoria tritici* on cereal plants, comprising treating the plants, their seed or the soil with a fungicidally effective amount of a composition comprising (a) pyraclostrobin or picoxystrobin compound and (b) prothioconazole or propiconazole compound.

WO2017162567 relates to a method for controlling *Septoria* leaf blotch on cereal plants caused by *Zymo Septoria tritici* containing the V136A and/or I381V mutation and optionally the G143A mutation, comprising treating cereal plants, their seed or the soil with a composition comprising (a) prothioconazole compound and (b) difenoconazole or tebuconazole compound and (c) at least one strobilurine fungicide compound.

WO2018069114 disclose a method for controlling *Septoria tritici* resistant to SDHI fungicides, on cereals comprising treating the plants with pydiflumetofen.

Therefore, the present invention relates to a novel composition which effectively controls fungal leaf spot diseases caused by Zymoseptoria fungus in plants as well as a method for treating the plants that provides excellent control over said disease in plants and provides high yields, maintain nutrition and quality of the plants.

OBJECTS OF THE INVENTION

The present invention, described hereinafter, achieves at least one of the following objects of the invention.

It is an object of the present invention to provide a fungicide composition comprising a multi-site fungicide for controlling Zymoseptoria infection in plants.

It is another object of the present invention to provide a fungicide composition comprising a multi-site fungicide for treating fungal leaf spot diseases caused by zymoseptoria fungus in plants.

It is another object of the present invention to provide use of multi-site contact fungicide for controlling zymoseptoria fungus in plants.

It is another object of the present invention to provide use of multi-site fungicide for treating *Septoria* leaf spot diseases in plants.

It is another object of the present invention to provide use of multi-site fungicide for treating *Septoria* leaf spot diseases caused by zymoseptoria fungus in plants.

It is another object of the present invention to provide a method to prevent and/or to control zymoseptoria infection in plants.

It is another object of the present invention to provide a method of controlling Zymoseptoria infection in plants that boosts the nutrient level in the plants and improves the quality of the plants.

It is another object of the present invention to provide a method of treating *Septoria* leaf blotch diseases in plants such that the quantities of fungicides used in the treatment is greatly reduced.

It is another object of the present invention to provide a method for controlling Zymoseptoria fungus in plants wherein the fungicides used provides efficacious treatment of *Septoria* leaf blotch diseases.

SUMMARY OF THE INVENTION

In another aspect, the present invention provides a fungicidal composition for controlling zymoseptoria infection in plants.

In an aspect, the present invention provides a fungicidal composition for controlling zymoseptoria infection in a host leguminous plant.

In an aspect, the present invention provides a fungicidal composition comprising at least one fungicide selected from captan, folpet, captafol or combinations thereof for controlling zymoseptoria infection in cereal plants.

In an aspect, the present invention provides a fungicidal composition comprising captan for controlling zymoseptoria infection in cereal plants.

In another aspect the present invention provides a fungicidal composition comprising fungicidally effective amount of a multi-site fungicide for controlling zymoseptoria infection in a host leguminous plant.

In another aspect the present invention provides a fungicidal composition comprising fungicidally effective amount of a multi-site fungicide for controlling *Septoria* leaf blotch diseases in a host leguminous plant.

In another aspect the present invention provides a fungicidal composition comprising fungicidally effective amount of a multi-site fungicide for controlling *Septoria* leaf blotch diseases caused by zymoseptoria infection in a host leguminous plant.

In another aspect, the present invention provides a fungicidal combination for treating zymoseptoria infection in cereal plants, wherein the combination comprises a first a multi-site fungicide, and at least another fungicide selected from a demethylation inhibitor, quinone outside inhibitor, succinate dehydrogenase inhibitor, quinone inside inhibitor or combinations thereof.

In another aspect, the present invention provides a fungicidal combination for treating zymoseptoria infection in cereal plants, wherein the combination comprises captan, and at least another fungicide selected from a demethylation inhibitor, quinone outside inhibitor, succinate dehydrogenase inhibitor, quinone inside inhibitor or combinations thereof.

In another aspect, the present invention provides a fungicidal combination for treating zymoseptoria infection in a host leguminous plant, wherein the combination comprises a first a multi-site fungicide, and at least another fungicide selected from a demethylation inhibitor, quinone outside inhibitor, succinate dehydrogenase inhibitor, quinone inside inhibitor or combinations thereof.

In another aspect the present invention provides a fungicidal composition for controlling zymoseptoria infection in cereal plants comprising
   (i) a fungicidally effective amount of a multi-site fungicide and
   (ii) at least a second fungicide is selected from the group consisting of a quinone outside inhibitor, a quinone inside inhibitor, a demethylation inhibitor and a succinate dehydrogenase inhibitor.

In another aspect the present invention provides a fungicidal composition for controlling zymoseptoria infection in cereal plants comprising
   1) a fungicidally effective amount of captan and
   2) at least a second fungicide is selected from the group consisting of a quinone outside inhibitor, a quinone inside inhibitor, a demethylation inhibitor and a succinate dehydrogenase inhibitor.

In another aspect the present invention provides a fungicidal composition for controlling zymoseptoria infection in a host leguminous or cereal plants comprising
   (i) a fungicidally effective amount of a multi-site fungicide and
   (ii) at least a second fungicide selected from the group consisting of a quinone outside inhibitor, a quinone inside inhibitor, a demethylation inhibitor and a succinate dehydrogenase inhibitor.
   (iii) at least a third fungicide is selected from the group consisting of a quinone outside inhibitor, a quinone inside inhibitor, a demethylation inhibitor and a succinate dehydrogenase inhibitor.

In an embodiment, the first and second systemic fungicides belong to different classes of systemic fungicides.

In another aspect, the present invention provides the use of a multi-site fungicide as a synergist to improve disease control in plants infected by zymoseptoria when applied subsequently, prior or concurrently to at least another fungicide selected from quinone outside inhibitor, a quinone inside inhibitor, a demethylation inhibitor, a succinate dehydrogenase inhibitor or combinations thereof.

In another aspect the present invention provides the use of captan as a synergist to improve disease control in plants infected by zymoseptoria and also enhances the yield of the plants.

In another aspect the present invention provides a method of treating zymoseptoria infection in a host leguminous and/or cereal plant, comprising: applying to the plant at the locus of the infection a fungicidal composition of the present invention.

In an embodiment a method of treating fungal leaf spot diseases caused by zymoseptoria in a host leguminous plant, comprising: applying to the plant at the locus of the infection a fungicidal composition comprising a multi-site fungicide.

In an embodiment a method of controlling fungal leaf spot diseases caused by zymoseptoria in plants, comprising: applying to the plant at the locus of the infection a fungicidal composition comprising a multi-site fungicide and one or more another fungicide.

BRIEF DESCRIPTION OF THE DRAWINGS

FIG. 1: Percentage efficacy of Zymoseptoria *tritici* strain Zt Tri-R6, moderately resistant to DMI and Highly resistant to QoI fungicides, on wheat leaf fragments untreated or treated preventively with Captan, Chlorothalonil, Sulphur and Mancozeb in controlled conditions.

DETAILED DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of materials/ ingredients used in the specification are to be understood as being modified in all instances by the term "about".

Thus, before describing the present invention in detail, it is to be understood that this invention is not limited to particularly exemplified systems or process parameters that may of course, vary. It is also to be understood that the terminology used herein is for the purpose of describing particular embodiments of the invention only and is not intended to limit the scope of the invention in any manner. The use of examples anywhere in this specification including examples of any terms discussed herein is illustrative only, and in no way limits the scope and meaning of the invention or of any exemplified term. Likewise, the invention is not limited to various embodiments given in this specification. Unless otherwise defined, all technical and scientific terms used herein have the same meaning as commonly understood by one of ordinary skill in the art to which this invention pertains. In the case of conflict, the present document, including definitions will control.

It must be noted that, as used in this specification, the singular forms "a," "an" and "the" include plural referents unless the content clearly dictates otherwise. The terms "preferred" and "preferably" refer to embodiments of the invention that may afford certain benefits, under certain circumstances.

As used herein, the terms "comprising" "including," "having," "containing," "involving," and the like are to be understood to be open-ended, i.e., to mean including but not limited to.

In any aspect or embodiment described hereinbelow, the phrase comprising may be replaced by the phrases "consisting of" or "consisting essentially of" or "consisting substantially of". In these aspects or embodiment, the combination or composition described includes or comprises or consists of or consists essentially of or consists substantially of the specific components recited therein, to the exclusion of other fungicides or plant growth promoting agents or adjuvants or excipients not specifically recited therein.

It has surprisingly been found that the use of a multi-site contact fungicide effectively for fighting against Zymoseptoria pathogen to move up the plant foliage. Without wishing to be bound by theory, it is believed that a multi-site contact fungicide has a very good fungicidal efficacy against Zymoseptoria and almost completely inhibits the development of this pathogen into wheat leaf tissues. It also penetrates the dense plant foliage, while effectively preventing the pathogen from infecting the remaining portion of the plant and reducing the susceptibility of the plant towards the infection. Further it is also found that when used in combination with at least one another fungicides it provides synergistic unexpected and surprising fungicide efficacy.

In an embodiment, the multisite contact fungicide is selected from captan, captafol or folpet or combinations thereof.

In an embodiment, the multisite contact fungicide is a combination comprising at least one selected from captan, captafol and folpet, and at least one another multisite contact fungicide as described herein. In this embodiment, another multisite fungicide is a contact fungicide other than captan, captafol or folpet.

In an embodiment, these compositions of the present invention may be especially effective against *Septoria* family of fungi.

For example the zymoseptoria fungus include species, Zymoseptoria *ardabiliae*, Zymoseptoria *brevis*, Zymoseptoria *Halophila*, Zymoseptoria *passerinii*, Zymoseptoria *pseudotritici*, Zymoseptoria *tritici* and Zymoseptoria verkleyi.

In an aspect the present invention provides a fungicidal composition comprising fungicidally effective amount of a multi-site contact fungicide for controlling zymoseptoria infection in a host leguminous plant.

In preferred embodiment the present invention provides a fungicidal composition comprising fungicidally effective amount of a multi-site contact fungicide for controlling zymoseptoria infection in cereal plants.

According to the invention, the fungicidal composition comprises a fungicidally effective amount of captan in the composition The term "effective amount" denotes an amount of the compositions, which is sufficient for controlling harmful fungi on cultivated plants or in the protection of materials and which does not result in a substantial damage to the treated plants. Such an amount can vary in a broad range and is dependent on various factors, such as the fungal species to be controlled, the treated cultivated plant or material, the climatic conditions and the specific composition used.

In general, the composition according to the invention may contain from 0.05 to 99% by weight of active compounds, preferably from 10 to 70% by weight.

In another aspect the present invention provides a fungicidal composition comprising fungicidally effective amount of a multi-site contact fungicide for controlling *Septoria* leaf blotch diseases in a host leguminous plant or cereal plants.

In another aspect the present invention provides a fungicidal composition comprising fungicidally effective amount of a multi-site fungicide for controlling *Septoria* leaf blotch diseases caused by zymoseptoria infection in a host leguminous plant.

In another aspect, the present invention provides a fungicidal combination for treating zymoseptoria infection in a host leguminous plant, wherein the combination comprises a first a multi-site contact fungicide, and at least another systemic fungicide selected from a demethylation inhibitor, quinone outside inhibitor, succinate dehydrogenase inhibitor, quinone inside inhibitor or combinations thereof.

In another aspect the present invention provides a fungicidal composition for controlling zymoseptoria infection in a host leguminous plant comprising
  a) a fungicidally effective amount of a multi-site fungicide and
  b) at least a second fungicide is selected from the group consisting of a quinone outside inhibitor, a quinone inside inhibitor, a demethylation inhibitor and a succinate dehydrogenase inhibitor.

In another aspect the present invention provides a fungicidal composition for controlling zymoseptoria infection in a host leguminous plant comprising
  a) a fungicidally effective amount of a multi-site contact fungicide and
  b) at least a second fungicide selected from the group consisting of a quinone outside inhibitor, a quinone inside inhibitor, a demethylation inhibitor and a succinate dehydrogenase inhibitor.
  c) at least a third fungicide is selected from the group consisting of a quinone outside inhibitor, a quinone inside inhibitor, a demethylation inhibitor and a succinate dehydrogenase inhibitor.

In another aspect the present invention provides a fungicidal combination comprising (a) a multi-site fungicide (b)

a second fungicide is a quinone outside inhibitor; and (c) a third fungicide is a demethylation inhibitor or a succinate dehydrogenase inhibitor.

In another aspect the present invention provides a fungicidal combination comprising (a) a multi-site fungicide (b) a second fungicide is a demethylation inhibitor; and (c) a third fungicide is selected from the group consisting of a quinone outside inhibitor, a quinone inside inhibitor, or a succinate dehydrogenase inhibitor.

In another aspect the present invention provides a fungicidal combination comprising (a) a multi-site fungicide (b) a second fungicide is a succinate dehydrogenase inhibitor; and (c) a third fungicide is selected from the group consisting of a quinone outside inhibitor, a quinone inside inhibitor, or a demthylation inhibitor.

In another aspect the present invention provides a fungicidal composition for controlling zymoseptoria infection in a host leguminous plant comprising
 a) a fungicidally effective amount of a multi-site fungicide and
 b) at least one quinone outside inhibitor.

In preferred embodiment the present invention provides a fungicidal composition for controlling zymoseptoria infection in cereal plants comprising
 a) a fungicidally effective amount of a multi-site fungicide and
 b) at least one quinone outside inhibitor.

In another aspect the present invention provides a fungicidal composition for controlling zymoseptoria infection in a host leguminous plant comprising
 a) a fungicidally effective amount of a multi-site fungicide and
 b) at least one quinone inside inhibitor In another aspect the present invention provides a fungicidal composition for controlling zymoseptoria infection in a host leguminous plant comprising
 a) a fungicidally effective amount of a multi-site fungicide and
 b) at least one demethylation inhibitor.

In another aspect the present invention provides a fungicidal composition for controlling zymoseptoria infection in a host leguminous plant comprising
 a) a fungicidally effective amount of a multi-site fungicide and
 b) at least one succinate dehydrogenase inhibitor.

In another aspect the present invention provides a fungicidal composition for controlling zymoseptoria infection in a host leguminous plant comprising
 a) a fungicidally effective amount of a multi-site fungicide and
 b) at least one quinone inside inhibitor
 c) at least one demethylation inhibitor In another aspect the present invention provides a fungicidal combination comprising a combination of a multi-site contact fungicide, preferably a phthalimide fungicides, along with a systemic fungicide selected from at least one Qo inhibitor (quinone outside inhibitors), at least one Qi (quinone inside inhibitor), at least one DM inhibitor (demethylation inhibitor) or at least one SDH Inhibitor (succinate dehydrogenase inhibitors).

The multi-site contact fungicides of the present invention inhibit fungal growth through multiple sites of action and have contact and preventive activity.

In an embodiment, the multisite contact fungicide is selected from folpet, captan or captafol or combinations thereof.

In an embodiment, the multisite contact fungicide is captan.

In an embodiment, the multisite contact fungicide is a combination comprising one of captan, folpet, or captafol; and at least another multisite contact fungicide as described herein. In this embodiment, the second multisite fungicide is a contact fungicide other than captan, folpet, or captafol.

The term "systemic fungicide" as used herein shall denote a fungicide that is absorbed into the plant tissue and possesses at least some amount of an after-infection activity. Preferably, the systemic fungicide of the present invention is capable of moving freely throughout the plant. However, the term "systemic fungicide" is intended herein to include the upwardly systemic fungicide as well as the locally systemic fungicide.

In an embodiment, the second multi-site contact fungicide is selected from:
 (i) copper fungicides selected from copper oxychloride, ¾ copper sulfate, copper hydroxide and tribasic copper sulfate (Bordeaux mixture);
 (ii) elemental sulfur;
 (iii) dithiocarbamate fungicides selected from amobam, asomate, azithiram, carbamorph, cufraneb, cuprobam, disulfiram, ferbam, metam, nabam, tecoram, thiram, urbacide, ziram, dazomet etem, milneb, mancopper, mancozeb, maneb, metiram, polycarbamate, propineb and zineb;
 (iv) chlorothalonil;
 (v) sulfamide fungicides selected from dichlofluanid and tolylfluanid;
 (vi) guanidine fungicides selected from dodine, guazantine t¾a and iminoctaadine;
 (vii) anilazine; dithianon; and
 combinations thereof.

In an embodiment the quinone outside inhibitor is selected from the group consisting of fenamidone, famoxadone, and a strobilurin fungicide selected from the group consisting of azoxystrobin, mandestrobin, coumoxystrobin, enoxastrobin, flufenoxystrobin, pyraoxystrobin, dimoxystrobin, enestrobin, fluoxastrobin, kresoxim-methyl, metominostrobin, orysastrobin, picoxystrobin, pyrametostrobin, triclopyricarb, fenaminstrobin, pyraclostrobin and trifloxystrobin; (b) the demethylation inhibitor is selected from the group consisting of triflumizole, triforine, pyridinitrile, pyrifenox, fenarimol, nuarimol, triarimol and a conazole fungicide selected from the group consisting of climbazole, clotrimazole, imazalil, oxpoconazole, prochloraz, prochloraz-manganese, triflumizole, azaconazole, bitertanol, bromuconazole, cyproconazole, diclobutrazol, difenoconazole, diniconazole, diniconazole-M, epoxiconazole, etaconazole, fenbuconazole, fluotrimazole, fluquinconazole, flusilazole, flutriafol, furconazole, furconazole-cis, hexaconazole, imibenconazole, ipconazole, metconazole, myclobutanil, pencoconazole, propiconazole, prothioconazole, quinconazole, simeconazole, tebuconazole, tetraconazole, triadimefon, triadimenol, triticonazole, uniconazole, perfurazoate and uniconazole-P.

In an embodiment the quinone inside inhibitor includes cyanoimidazole fungicides and sulfamoyltriazole fungicides, selected from cyazofamid and amisulbrom.

In an embodiment the quinone outside inhibitor includes a strobilurin fungicide.

In this embodiment, the DM inhibitor is preferably a conazole fungicide selected from the group consisting of climbazole, clotrimazole, imazalil, oxpoconazole, prochloraz, prochloraz-manganese, triflumizole, azaconazole, bitertanol, bromuconazole, cyproconazole, diclobutrazol, difenoconazole, diniconazole, diniconazole-M, epoxiconazole, etaconazole, fenbuconazole, fluotrimazole, fluquinconazole, flusilazole, flutriafol, furconazole, furconazole-cis, hexaconazole, imibenconazole, ipconazole, metconazole, myclobutanil, pencoconazole, propiconazole, prothioconazole, quinconazole, simeconazole, tebuconazole, tetraconazole, triadimefon, triadimenol, triticonazole, uniconazole, perfurazoate and uniconazole-P.

In an embodiment the succinate dehydrogenase inhibitor is selected from the group consisting of benodanil, flutolanil, mepronil, fluopyram, fenfuram, carboxin, oxycarboxin, thifluzamide, bixafen, fluxapyroxad, furametpyr, isopyrazam, penflufen, penthiopyrad, sedaxane and boscalid or combinations thereof.

In an embodiment, systemic fungicide can be selected from the group consisting of a strobilurin fungicide, a conazole fungicide, and a succinate dehydrogenase inhibitor; wherein
(a) the strobilurin fungicide is selected from the group consisting of fluoxastrobin, mandestrobin, pyribencarb; methoxyacrylate strobilurin fungicides selected from azoxystrobin, bifujunzhi, coumoxystrobin, enoxastrobin, flufenoxystrobin, jiaxiangjunzhi, picoxystrobin, pyraoxystrobin; methoxycarbanilate strobilurin fungicides selected from pyraclostrobin, pyrametostrobin, triclopyricarb; methoxyiminoacetamide strobilurin fungicides selected from dimoxystrobin, fenaminstrobin, metominostrobin, orysastrobin; methoxyiminoacetate strobilurin fungicides selected from kresoxim-methyl, trifloxystrobin;
(b) the conazole fungicide is selected from the group consisting of climbazole, clotrimazole, imazalil, oxpoconazole, prochloraz, prochloraz-manganese, triflumizole, azaconazole, bitertanol, bromuconazole, cyproconazole, diclobutrazol, difenoconazole, diniconazole, diniconazole-M, epoxiconazole, etaconazole, fenbuconazole, fluotrimazole, fluquinconazole, flusilazole, flutriafol, furconazole, furconazole-cis, hexaconazole, imibenconazole, ipconazole, metconazole, myclobutanil, pencoconazole, propiconazole, prothioconazole, quinconazole, simeconazole, tebuconazole, tetraconazole, triadimefon, triadimenol, triticonazole, uniconazole, perfurazoate and uniconazole-P; and
(c) the succinate dehydrogenase inhibitor is selected from
(i) benzanilide fungicides selected from benodanil, flutolanil, mebenil, mepronil, salicylanilide, tecloftalam
(ii) benzamide fungicides selected from benzohydroxamic acid, fluopicolide, fluopimomide, fluopyram, tioxymid, trichlamide, zarilamid, zoxamide oxathiin fungicides selected from carboxin and oxycarboxin
(iii) thiazole fungicides selected from dichlobentiazox, ethaboxam, fluoxapiprolin, isotianil, metsulfovax, octhilinone, oxathiapiprolin, thiabendazole, thifluzamide
(iv) pyrazolecarboxamide fungicides selected from the group consisting of benzovindiflupyr, bixafen, fluindapyr, fluxapyroxad, furametpyr, isopyrazam, penflufen, penthiopyrad, pydiflumetofen, pyrapropoyne, sedaxane, fluxapyroxad isopyrazam and boscalid.
(v) anilide fungicides selected from benalaxyl, benalaxyl-M, bixafen, boscalid, carboxin, fenhexamid, fluxapyroxad, isotianil, metalaxyl, metalaxyl-M, metsulfovax, ofurace, oxadixyl, oxycarboxin, penflufen, pyracarbolid, pyraziflumid, sedaxane, thifluzamide, tiadinil, vanguard
(vi) pyrazolecarboxamide fungicides selected from benzovindiflupyr, bixafen, fluindapyr, fluxapyroxad, furametpyr, isopyrazam, penflufen, penthiopyrad, pydiflumetofen, pyrapropoyne, sedaxane It has been found that a combination of a multi-site contact fungicide, preferably at least one phthalimide fungicide, along with a systemic fungicide selected from at least one Qo inhibitor (quinone outside inhibitors), at least one Qi (quinone inside inhibitor), at least one DM inhibitor (demethylation inhibitor) or at least one SDH Inhibitor (succinate dehydrogenase inhibitors) leads to an unexpected and surprisingly good control of zymoSeptoria tritici.

In an embodiment, the multisite contact fungicide is selected from folpet, captan or captafol.

In an embodiment, the multisite contact fungicide is captan.

In an embodiment, the multisite contact fungicide is a combination comprising at least one of captan, folpet, or captafol; and at least another multisite contact fungicide as described herein. In this embodiment, the second multisite fungicide is a contact fungicide other than captan, folpet, or captafol.

In an embodiment, the multisite fungicide in the combination is captan and the systemic fungicide is fluxapyroxad.

In an embodiment, the multisite fungicide is captan, folpet or captafol; and the systemic fungicide is a combination comprising fluxapyroxad and prothioconazole.

In an embodiment, the multisite fungicide is captan; and the systemic fungicide is a combination comprising fluxapyroxad and prothioconazole.

In an embodiment, the multisite fungicide is captan, folpet or captafol; and the systemic fungicide is prothioconazole.

In an embodiment, the multisite fungicide is captan; and the systemic fungicide is prothioconazole.

In an embodiment, the multisite contact fungicide is chlorothlonil, and a phthalimide fungicide selected from folpet, captan or captafol.

In an embodiment, the multisite contact fungicide is a combination comprising captan and chlorothalonil.

In an embodiment, the multisite contact fungicide is a combination comprising one of captan, folpet, or captafol; and chlorothalonil.

In an embodiment, the multisite fungicide is a combination comprising chlorothalonil and one of captan, folpet, or captafol; and the systemic fungicide is fluxapyroxad.

In an embodiment, the multisite fungicide is a combination comprising chlorothalonil and captan and the systemic fungicide is fluxapyroxad.

In an embodiment, the multisite fungicide is a combination comprising chlorothalonil and one of captan, folpet or captafol; and the systemic fungicide is a combination comprising fluxapyroxad and prothioconazole.

In an embodiment, the multisite fungicide is a combination comprising chlorothalonil and captan; and the systemic fungicide is a combination comprising fluxapyroxad and prothioconazole.

In an embodiment, the multisite fungicide is a combination comprising chlorothalonil and one of captan, folpet or captafol; and the systemic fungicide is prothioconazole.

In an embodiment, the multisite fungicide is a combination comprising chlorothalonil and captan; and the systemic fungicide is prothioconazole.

In an embodiment, the multisite fungicide is captan, folpet or captafol; and the systemic fungicide is fluoxapyroxad.

In an embodiment, the multisite fungicide is captan, folpet or captafol; and the systemic fungicide is penthiopyrad.

In an embodiment, the multisite fungicide is captan, folpet or captafol; and the systemic fungicide is bixafen.

In an embodiment, the multisite fungicide is captan, folpet or captafol; and the systemic fungicide is fluindapyr.

In an embodiment, the multisite fungicide is captan, folpet or captafol; and the systemic fungicide is benzovindiflupyr.

In an embodiment, the multisite fungicide is captan, folpet or captafol; and the systemic fungicide is prothioconazole.

In an embodiment, the multisite fungicide is captan, folpet or captafol; and the systemic fungicide is tetraconazole.

In an embodiment, the multisite fungicide is at least one selected from captan, folpet or captafol; and the systemic fungicide is difenoconazole.

In an embodiment, the composition comprising at least one fungicide selected from captan, folpet or captafol; and difenoconazole, further comprising sulphur.

In an embodiment, the multisite fungicide is captan, folpet or captafol; and the systemic fungicide is fluoxastrobin.

In an embodiment, the multisite fungicide is captan, folpet or captafol; and the systemic fungicide is azoxystrobin.

In an embodiment, the multisite fungicide is a combination comprising copper and one of captan, folpet or captafol.

In an embodiment, the multisite fungicide is a combination comprising sulfur and one of captan, folpet or captafol.

In an embodiment, the multisite fungicide is mancozeb, and one of captan, folpet or captafol.

In preferred embodiment, the multisite fungicide is selected from captan, folpet, or captafol.

In an embodiment, the multisite fungicide is a combination of captan, folpet, or captafol with a second multisite fungicide.

In an embodiment, the second multi-site fungicide is selected from the group consisting of dithiocarbamates, chloronitriles, inorganic fungicides, sulfamides, bis-guanidines, triazines, quinones, quinoxalines, dicoarboxamides and mixtures thereof.

In an embodiment, the second multi-site fungicide is selected from the class of dithiocarbamate fungicides selected from asamobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb.

In an embodiment, the second multi-site fungicide is a chloronitrile fungicide such as chlorothalonil.

In an embodiment, the second multi-site fungicide is a sulfamide fungicide selected from dichlofluanid and tolylfluanid.

In an embodiment, the second multi-site fungicide is a bis-guanidine fungicide selected from guazatine and iminoctadine.

In an embodiment, the second multi-site fungicide is a triazine fungicide selected from anilazine.

In an embodiment, the second multi-site fungicide is a quinone fungicide selected from dithianon.

In an embodiment, the second multi-site fungicide is a quinoxaline fungicide selected from quinomethionate and chlorquinox.

In an embodiment, the second multi-site fungicide is a dicarboxamide fungicide selected from fluoroimide.

In an embodiment, the second multi-site fungicide is an inorganic fungicide selected from copper fungicides including copper (II) hydroxide, copper oxychloride, copper (II) sulfate, basic copper sulfate, Bordeaux mixture, copper salicylate $C_7H_4O_3*Cu$, cuprous oxide $CU_2O$; or sulphur.

In an embodiment, the combination of the present invention comprises at least a systemic fungicide apart from the multisite fungicide or its combinations.

In one preferred embodiment, the composition comprises combination of at least one fungicide selected from captan, folpet, or captafol and sulphur.

In an embodiment, the systemic fungicide is a combination of at least two more systemic fungicides. In this embodiment, these systemic fungicides are referred to herein as the second and the third fungicide respectively. However, the second and the third fungicide are never the same fungicides, although they can be a combination of two fungicides from the same class of fungicides.

In an embodiment, the second and/or third fungicide in the combinations of the present invention may be individually selected from nucleic acids synthesis inhibitors, cytoskeleton and motor protein inhibitors, amino acids and protein synthesis inhibitors, respiration process inhibitors, signal transduction inhibitors, lipid synthesis and membrane integrity distruptors, sterol biosynthesis inhibitors, melanin synthesis inhibitors, cell wall biosynthesis inhibitors, host plant defence inductors and/or fungicides with unknown modes of action.

Thus, in an embodiment, the nucleic acid synthesis inhibitor fungicide may be selected from acylalanines such as benalaxyl, benalaxyl-M (kiralaxyl), furalaxyl, metalaxyl, metalaxyl-M (mefenoxam), oxazolidinones such as oxadixyl, butyrolactones such as ofurace, hydroxy-(2-amino-)pyrimidines such as bupirimate, dimethirimol, ethirimol, isoxazoles such as hymexazole, isothiazolones such as octhilinone, carboxylic acids such as oxolinic acid.

In an embodiment, the cytoskeleton and motor protein inhibitors may be benzimidazoles such as benomyl, carbendazim, fuberidazole, thiabendazole; thiophanates such as thiophanate, thiophanate-methyl; N-phenyl carbamates such as diethofencarb; toluamides such as zoxamide; thiazole carboxamides such as ethaboxam; phenylureas such as pencycuron, benzamides such as fluopicolide; cyanoacrylates such as phenamacril.

In an embodiment, the respiration process inhibitor fungicides may be selected from pyrimidinamines such as diflumetorim; pyrazole-5-carboxamides such as tolfenpyrad, strobilurins such as azoxystrobin, coumoxystrobin, enoxastrobin, flufenoxystrobin, picoxystrobin, pyraoxystrobin, mandestrobin, pyraclostrobin, pyrametostrobin, triclopyri carb, kresoxim-methyl, dimoxystrobin, fenaminostrobin, metominostrobin, trifloxystrobin, famoxadone, fluoxastrobin, fenamidone, pyribencarb and mixtures thereof; oxazolidine-diones such as famoxadone;

Imidazolinones such as fenamidone; benzyl-carbamates such as pyribencarb; N-methoxy-(phenyl-ethyl)-pyrazole-carboxamides such as Pyrimidinamines such as diflumetorim; cyano-imidazole such as cyazofamid; sulfamoyl-triazole such as amisulbrom; dinitrophenyl crotonates such as binapacryl, meptyldinocap, dinocap; 2,6-dinitro-anilines such as fluazinam; pyr.-hydrazones such as ferimzone; triphenyl tin compounds such as fentin acetate, fentin chloride, fentin hydroxide; thiophene-carboxamides such as silthiofam; triazolo-pyrimidylamine such as ametoctradin.

In an embodiment, amino acids and protein synthesis inhibitor fungicides may be selected from anilino-pyrimidines such as cyprodinil, mepanipyrim, pyrimethanil, antibiotic fungicides such as blasticidin-S, kasugamycin, streptomycin, oxytetracycline and the like.

In an embodiment, signal transduction inhibitor fungicides may be selected from aryloxyquinolines such as quinoxyfen; quinazolinones such as proquinazid; phenylpyrroles such as fenpiclonil, fludioxonil; dicarboximides such as chlozolinate, dimethachlone, iprodione, procymidone and vinclozolin.

In an embodiment, the fungicide may be selected from lipid synthesis and membrane integrity distruptors such as phosphoro-thiolates such as edifenphos, Iprobenfos, pyrazophos; dithiolanes such as isoprothiolane; aromatic hydrocarbons such as biphenyl, chloroneb, dicloran, quintozene (PCNB), tecnazene (TCNB), tolclofos-methyl and the like; 1,2,4-thiadiazoles such as etridiazole; carbamates such as iodocarb, propamocarb, prothiocarb and the like.

Thus in an embodiment, the sterol biosynthesis inhibitors may be selected from triazoles such as azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, Ipconazole, metconazole, myclobutanil, penconazole, Propiconazole, simeconazole, tebuconazole, tetraconazole, triadimefon, triadimenol, triticonazole, prothioconazole, piperazines such as triforine; pyridines such as pyrifenox, pyrisoxazole; pyrimidines such as fenarimol, nuarimol imidazoles such as imazalil, oxpoconazole, pefurazoate, prochloraz, triflumizole; morpholines such as aldimorph, dodemorph, fenpropimorph, tridemorph and the like; piperidines such as fenpropidin, piperalin; spiroketalamines such as spiroxamine; hydroxyanilides such as fenhexamid; amino-pyrazolinones such as fenpyrazamine; thiocarbamates such as pyributicarb; allylamines such as naftifine, terbinafine and mixtrues thereof.

In an embodiment, cell wall biosynthesis inhibitor fungicides may be selected from peptidyl pyrimidine nucleoside fungicides such as polyoxin, cinnamic acid amides such as dimethomorph, flumorph, pyrimorph; valinamide carbamates such as benthiavalicarb, iprovalicarb, valifenalate; mandelic acid amides such as mandipropamid and mixtures thereof.

In an embodiment, melanin synthesis inhibitor fungicide may be selected from isobenzo-furanone such as fthalide; pyrrolo-quinolinones such as pyroquilon; triazolobenzo-thiazoles such as tricyclazole; cyclopropane-carboxamides such as carpropamid; carboxamides such as diclocymet; propionamides such as fenoxanil; trifluoroethyl-carbamates such as tolprocarb; and mixtures thereof.

In an embodiment, host plant defence inductors fungicides may be selected from benzo-thiadiazoles such as acibenzolar-S-methyl; benzisothiazoles such as probenazole; thiadiazole-carboxamides such as tiadinil, isotianil; polysaccharides such as laminarin; and mixtures thereof.

In an embodiment, the additional second or third fungicide is a fungicide with unknown mode of action and may be selected from cyanoacetamide-oximes such as cymoxanil; ethyl phosphonates such as foestyl—Al, phophorous acid and salts; phthalamic acids such as teclofthalam; benzotriazines such as triazoxide; benzene-sulphonamides such as flusulfamide; pyridazinones such as diclomezine;

thiocarbamates such as methasulfocarb; phenyl-acetamides such as cyflufenamid; aryl-phenyl-ketones such as metrafenone, pyriofenone; guanidines such as dodine; cyano-methylene-thiazolidines such as flutianil; pyrimidinone-hydrazones such as ferimzone; piperidinyl-thiazole-isoxazolines such as oxathiapiprolin; 4-quinolyl-acetates such as tebufloquin; tetrazolyloximes such as picarbutrazox; glucopyranosyl antibiotics such as validamycin; fungicides such as mineral oil, organic oils, potassium bicarbonate and mixtures thereof.

In a preferred embodiment, the second fungicide in the combinations of the present invention may be individually selected from ergosterol biosynthesis inhibitors and Quinone outside (Qo) inhibitors.

In another embodiment, the second fungicide of the present invention is a succinate dehydrogenase inhibitor fungicide (SDHI). Preferably, the succinate dehydrogenase inhibitor is selected from the group consisting of benodanil, flutolanil, mepronil, fluopyram, fenfuram, carboxin, oxycarboxin, thifluzamide, bixafen, fluxapyroxad, furametpyr, isopyrazam, penflufen, penthiopyrad, sedaxane and boscalid.

In another preferred embodiment, the second fungicide and the third fungicide in the combinations of the present invention may be ergosterol biosynthesis inhibitors and Quinone outside (Qo) inhibitors respectively.

The ergosterol biosynthesis inhibitors may be selected from the group consisting of azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, Ipconazole, metconazole, myclobutanil, penconazole, Propiconazole, simeconazole, tebuconazole, tetraconazole, triadimefon, triadimenol, triticonazole, prothioconazole, imazalil, oxpoconazole, pefurazoate, prochloraz, triflumizole, fenarimol, nuarimol, pyrifenox, pyrisoxazole, and triforine.

In another embodiment, the ergosterol biosynthesis inhibitors may be selected from prothioconazole, tebuconazole, hexaconazole, cyroconazole or epoxiconazole.

In an embodiment, the third fungicide may be a Quinone outside (Qo) inhibitor fungicide selected from azoxystrobin, coumoxystrobin, enoxastrobin, flufenoxystrobin, picoxystrobin, pyraoxystrobin, mandestrobin, pyraclostrobin, pyrametostrobin, triclopyri carb, kresoxim-methyl, dimoxystrobin, fenaminostrobin, metominostrobin, trifloxystrobin, famoxadone, fluoxastrobin, fenamidone, and pyribencarb.

In an embodiment, the Quinone outside (Qo) inhibitor fungicide may be selected from azoxystrobin, picoxystrobin, kresoxim-methyl, pyraclostrobin and trifloxystrobin.

In an embodiment, the second and third fungicide of the present invention may be selected from a strobilurin fungicide and a conazole fungicide respectively.

In another embodiment, the second and the third fungicide may be selected from a strobilurin fungicide and a succinate dehydrogenase inhibitor fungicide respectively.

In yet another embodiment, the second the third fungicide may be selected from a conazole fungicide and a succinate dehydrogenase inhibitor fungicide respectively.

In these embodiments:
the succinate dehydrogenase inhibitor fungicide may be selected from the group consisting of benodanil, flutolanil, mepronil, fluopyram, fenfuram, carboxin, oxycarboxin, thifluzamide, bixafen, fluxapyroxad, furametpyr, isopyrazam, penflufen, penthiopyrad, sedaxane and boscalid; or
the succinate dehydrogenase inhibitor fungicide may be preferably selected from the group consisting of thifluzamide, bixafen, fluxapyroxad, isopyrazam, penthiopyrad, sedaxane and boscalid; or
the conazole fungicide may be selected from the group consisting of azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, Ipconazole, metconazole, myclobutanil, penconazole, Propiconazole, simeconazole, tebuconazole, tetraconazole, triadimefon, triadimenol, triticonazole, prothioconazole, imazalil, oxpoconazole, pefurazoate, prochloraz, triflumizole, fenarimol, nuarimol, pyrifenox, pyrisoxazole, and triforine; or the conazole fungicide may be preferably selected from the group consisting of prothioconazole, tebuconazole, hexaconazole, cyroconazole or epoxiconazole; or the strobilurin fungicide may be selected from the group consisting of azoxystrobin, coumoxystrobin, enoxastrobin, flufenoxystrobin, picoxystrobin, pyraoxystrobin, mandestrobin, pyraclostrobin, pyrametostrobin, triclopyricarb, kresoxim-methyl, dimoxystrobin, fenaminostrobin, metominostrobin, trifloxystrobin, famoxadone, fluoxastrobin, fenamidone, and pyribencarb; or the strobilurin fungicide may be preferably selected from the group consisting of azoxystrobin, picoxystrobin, kresoxim-methyl, pyraclostrobin and trifloxystrobin.

In an embodiment, the combinations of the present invention include the following preferred combinations. In the exemplary combinations tabulated below, the term "Fungicide A" means at least one, and preferably individually each one of the fungicides selected from mancozeb (A1), sulfur (A2), copper salt e.g. tribasic copper sulfate (TBCS (A3)), or chlorothalonil (A4) as being specifically combined herein with the remaining agrochemicals.

In the exemplary combinations tabulated below, the term "fungicide B" means at least one, and preferably individually each one of the fungicides selected from captan (B1), folpet (B2), or captafol (B3) as being specifically combined herein with the remaining fungicides.

In the exemplary combinations tabulated below, the term "Fungicide C" means at least one, and preferably individually each one of the fungicides selected from cyproconazole (C1), difenoconazole (C2), epoxiconazole (C3), hexaconazole (C4), tebuconazole (C5), tetraconazole (C6), prothioconazole (C7), metalaxyl (C8), metalaxyl-M (C9), benomyl (C10), carbendazim (C11), thiophanate-methyl (C12), zoxamide (C13), fluopicolide (C14), phenamacril (C15), cyazofamid (C16), amisulbrom (C17), tricyclazole (C18), oxathiapiprolin (C19), and picarbutrazox (C20).

In the exemplary combinations tabulated below, the term "Fungicide D" means at least one, and preferably individually each one of the fungicides selected from azoxystrobin (D1), picoxystrobin (D2), pyraclostrobin (D3), kresoxim-methyl (D4), trfloxystrobin (D5), cyproconazole (D6), difenoconazole (D7), hexaconazole (D8), epoxiconazole (D9), tebuconazole (D10), tetraconazole (D11), prothioconazole (D12), benomyl (D13), carbendazim (D14), thiophanate-methyl (D15), zoxamide (D16), fluopicolide (D17), phenamacril (D18), cyazofamid (D19), amisulbrom (D20), tricyclazole (D21), oxathiapiprolin (D22), picarbutrazox (D23), metalaxyl (D24), and metalaxyl-M (D25).

In an embodiment the present compositions comprise a mixture of Fungicide (B) with Fungicide (C) or a mixture of Fungicide (B) with Fungicide (D).

In an exemplary embodiment the combination of Fungicide (B) with another fungicide is represented in below tables.

| S No. | A | B | C | D |
|---|---|---|---|---|
| 1 | Fungicide A | Fungicide B | Cyproconazole | — |
| 2 | Fungicide A | Fungicide B | Difenoconazole | — |
| 3 | Fungicide A | Fungicide B | Epoxiconazole | — |
| 4 | Fungicide A | Fungicide B | Hexaconazole | — |
| 5 | Fungicide A | Fungicide B | Tebuconazole | — |
| 6 | Fungicide A | Fungicide B | Tetraconazole | — |
| 7 | Fungicide A | Fungicide B | Prothioconazole | — |
| 8 | Fungicide A | Fungicide B | — | Azoxystrobin |
| 9 | Fungicide A | Fungicide B | — | Picoxystrobin |
| 10 | Fungicide A | Fungicide B | — | Pyraclostrobin |
| 11 | Fungicide A | Fungicide B | — | Kresoxim-methyl |
| 12 | Fungicide A | Fungicide B | — | Trifloxystrobin |
| 13 | Fungicide A | Fungicide B | Cyproconazole | Azoxystrobin |
| 14 | Fungicide A | Fungicide B | Cyproconazole | Picoxystrobin |
| 15 | Fungicide A | Fungicide B | Cyproconazole | Pyraclostrobin |
| 16 | Fungicide A | Fungicide B | Cyproconazole | Kresoxim-methyl |
| 17 | Fungicide A | Fungicide B | Cyproconazole | Trifloxystrobin |
| 18 | Fungicide A | Fungicide B | Difenoconazole | Azoxystrobin |
| 19 | Fungicide A | Fungicide B | Difenoconazole | Picoxystrobin |
| 20 | Fungicide A | Fungicide B | Difenoconazole | Pyraclostrobin |
| 21 | Fungicide A | Fungicide B | Difenoconazole | Kresoxim-methyl |
| 22 | Fungicide A | Fungicide B | Difenoconazole | Trifloxystrobin |
| 23 | Fungicide A | Fungicide B | Epoxiconazole | Azoxystrobin |
| 24 | Fungicide A | Fungicide B | Epoxiconazole | Picoxystrobin |
| 25 | Fungicide A | Fungicide B | Epoxiconazole | Pyraclostrobin |
| 26 | Fungicide A | Fungicide B | Epoxiconazole | Kresoxim-methyl |
| 27 | Fungicide A | Fungicide B | Epoxiconazole | Trifloxystrobin |
| 28 | Fungicide A | Fungicide B | Hexaconazole | Azoxystrobin |
| 29 | Fungicide A | Fungicide B | Hexaconazole | Picoxystrobin |
| 30 | Fungicide A | Fungicide B | Hexaconazole | Pyraclostrobin |
| 31 | Fungicide A | Fungicide B | Hexaconazole | Kresoxim-methyl |
| 32 | Fungicide A | Fungicide B | Hexaconazole | Trifloxystrobin |
| 33 | Fungicide A | Fungicide B | Tebuconazole | Azoxystrobin |
| 34 | Fungicide A | Fungicide B | Tebuconazole | Picoxystrobin |
| 35 | Fungicide A | Fungicide B | Tebuconazole | Pyraclostrobin |
| 36 | Fungicide A | Fungicide B | Tebuconazole | Kresoxim-methyl |
| 37 | Fungicide A | Fungicide B | Tebuconazole | Trifloxystrobin |
| 38 | Fungicide A | Fungicide B | Tetraconazole | Azoxystrobin |
| 39 | Fungicide A | Fungicide B | Tetraconazole | Picoxystrobin |
| 40 | Fungicide A | Fungicide B | Tetraconazole | Pyraclostrobin |
| 41 | Fungicide A | Fungicide B | Tetraconazole | Kresoxim-methyl |
| 42 | Fungicide A | Fungicide B | Tetraconazole | Trifloxystrobin |
| 43 | Fungicide A | Fungicide B | Prothioconazole | Azoxystrobin |
| 44 | Fungicide A | Fungicide B | Prothioconazole | Picoxystrobin |
| 45 | Fungicide A | Fungicide B | Prothioconazole | Pyraclostrobin |
| 46 | Fungicide A | Fungicide B | Prothioconazole | Kresoxim-methyl |
| 47 | Fungicide A | Fungicide B | Prothioconazole | Trifloxystrobin |
| 48 | Fungicide A | Fungicide B | Metalaxyl | — |
| 49 | Fungicide A | Fungicide B | Metalaxy-m | — |
| 50 | Fungicide A | Fungicide B | Benomyl | — |
| 51 | Fungicide A | Fungicide B | Carbendazim | — |
| 52 | Fungicide A | Fungicide B | Thiophanate methyl | — |
| 53 | Fungicide A | Fungicide B | Zoxamide | — |
| 54 | Fungicide A | Fungicide B | Fluopicolide | — |
| 55 | Fungicide A | Fungicide B | Phenamacril | — |
| 56 | Fungicide A | Fungicide B | Cyazofamid | — |
| 57 | Fungicide A | Fungicide B | Amisulbrom | — |
| 58 | Fungicide A | Fungicide B | Tricyclazole | — |
| 59 | Fungicide A | Fungicide B | Oxathiapiprolin | — |
| 60 | Fungicide A | Fungicide B | Picarbutrazox | — |
| 61 | Fungicide A | Fungicide B | Metalaxyl/Metalaxyl-M | Cyproconazole |
| 62 | Fungicide A | Fungicide B | Metalaxyl/Metalaxyl-M | Difenoconazole |
| 63 | Fungicide A | Fungicide B | Metalaxyl/Metalaxyl-M | Epoxiconazole |
| 64 | Fungicide A | Fungicide B | Metalaxyl/Metalaxyl-M | Hexaconazole |
| 65 | Fungicide A | Fungicide B | Metalaxyl/Metalaxyl-M | Tebuconazole |
| 66 | Fungicide A | Fungicide B | Metalaxyl/Metalaxyl-M | Tetraconazole |
| 67 | Fungicide A | Fungicide B | Metalaxyl/Metalaxyl-M | Prothioconazole |

-continued

| S No. | A | B | C | D |
|---|---|---|---|---|
| 68 | Fungicide A | Fungicide B | Metalaxyl/Metalaxyl-M | Azoxystrobin |
| 69 | Fungicide A | Fungicide B | Metalaxyl/Metalaxyl-M | Picoxystrobin |
| 70 | Fungicide A | Fungicide B | Metalaxyl/Metalaxyl-M | Pyraclostrobin |
| 71 | Fungicide A | Fungicide B | Metalaxyl/Metalaxyl-M | Kresoxim-methyl |
| 72 | Fungicide A | Fungicide B | Metalaxyl/Metalaxyl-M | Benomyl |
| 73 | Fungicide A | Fungicide B | Metalaxyl/Metalaxyl-M | Carbendazim |
| 74 | Fungicide A | Fungicide B | Metalaxyl/Metalaxyl-M | Thiophanate methyl |
| 75 | Fungicide A | Fungicide B | Metalaxyl/Metalaxyl-M | Zoxamide |
| 76 | Fungicide A | Fungicide B | Metalaxyl/Metalaxyl-M | Fluopicolide |
| 77 | Fungicide A | Fungicide B | Metalaxyl/Metalaxyl-M | Phenamacril |
| 78 | Fungicide A | Fungicide B | Metalaxyl/Metalaxyl-M | Cyazofamid |
| 79 | Fungicide A | Fungicide B | Metalaxyl/Metalaxyl-M | Amisulbrom |
| 80 | Fungicide A | Fungicide B | Metalaxyl/Metalaxyl-M | Tricyclazole |
| 81 | Fungicide A | Fungicide B | Metalaxyl/Metalaxyl-M | Oxathiapiprolin |
| 82 | Fungicide A | Fungicide B | Metalaxyl/Metalaxyl-M | Picarbutrazox |
| 83 | Fungicide A | Fungicide B | Benomyl | Cyproconazole |
| 84 | Fungicide A | Fungicide B | Benomyl | Difenoconazole |
| 85 | Fungicide A | Fungicide B | Benomyl | Epoxiconazole |
| 86 | Fungicide A | Fungicide B | Benomyl | Hexaconazole |
| 87 | Fungicide A | Fungicide B | Benomyl | Tebuconazole |
| 88 | Fungicide A | Fungicide B | Benomyl | Tetraconazole |
| 89 | Fungicide A | Fungicide B | Benomyl | Prothioconazole |
| 90 | Fungicide A | Fungicide B | Benomyl | Azoxystrobin |
| 91 | Fungicide A | Fungicide B | Benomyl | Picoxystrobin |
| 92 | Fungicide A | Fungicide B | Benomyl | Pyraclostrobin |
| 93 | Fungicide A | Fungicide B | Benomyl | Kresoxim-methyl |
| 94 | Fungicide A | Fungicide B | Benomyl | Metalaxyl/Metalaxyl-M |
| 95 | Fungicide A | Fungicide B | Benomyl | Carbendazim |
| 96 | Fungicide A | Fungicide B | Benomyl | Thiophanate methyl |
| 97 | Fungicide A | Fungicide B | Benomyl | Zoxamide |
| 98 | Fungicide A | Fungicide B | Benomyl | Fluopicolide |
| 99 | Fungicide A | Fungicide B | Benomyl | Phenamacril |
| 100 | Fungicide A | Fungicide B | Benomyl | Cyazofamid |
| 101 | Fungicide A | Fungicide B | Benomyl | amisulbrom |
| 102 | Fungicide A | Fungicide B | Benomyl | Tricyclazole |
| 103 | Fungicide A | Fungicide B | Benomyl | Oxathiapiprolin |
| 104 | Fungicide A | Fungicide B | Benomyl | Picarbutrazox |
| 105 | Fungicide A | Fungicide B | Carbendazim | Cyproconazole |
| 106 | Fungicide A | Fungicide B | Carbendazim | Difenoconazole |
| 107 | Fungicide A | Fungicide B | Carbendazim | Epoxiconazole |
| 108 | Fungicide A | Fungicide B | Carbendazim | Hexaconazole |
| 109 | Fungicide A | Fungicide B | Carbendazim | Tebuconazole |
| 110 | Fungicide A | Fungicide B | Carbendazim | Tetraconazole |
| 111 | Fungicide A | Fungicide B | Carbendazim | Prothioconazole |
| 112 | Fungicide A | Fungicide B | Carbendazim | Azoxystrobin |
| 113 | Fungicide A | Fungicide B | Carbendazim | Picoxystrobin |
| 114 | Fungicide A | Fungicide B | Carbendazim | Pyraclostrobin |
| 115 | Fungicide A | Fungicide B | Carbendazim | Kresoxim-methyl |
| 116 | Fungicide A | Fungicide B | Carbendazim | Benomyl |
| 117 | Fungicide A | Fungicide B | Carbendazim | Metalaxyl/Metalaxyl-M |
| 118 | Fungicide A | Fungicide B | Carbendazim | Thiophanate methyl |
| 119 | Fungicide A | Fungicide B | Carbendazim | Zoxamide |
| 120 | Fungicide A | Fungicide B | Carbendazim | Fluopicolide |
| 121 | Fungicide A | Fungicide B | Carbendazim | Phenamacril |
| 122 | Fungicide A | Fungicide B | Carbendazim | Cyazofamid |
| 123 | Fungicide A | Fungicide B | Carbendazim | Amisulbrom |
| 124 | Fungicide A | Fungicide B | Carbendazim | Tricyclazole |
| 125 | Fungicide A | Fungicide B | Carbendazim | Oxathiapiprolin |
| 126 | Fungicide A | Fungicide B | Carbendazim | Picarbutrazox |
| 127 | Fungicide A | Fungicide B | Thiophanate methyl | Cyproconazole |
| 128 | Fungicide A | Fungicide B | Thiophanate methyl | Difenoconazole |
| 129 | Fungicide A | Fungicide B | Thiophanate methyl | Epoxiconazole |
| 130 | Fungicide A | Fungicide B | Thiophanate methyl | Hexaconazole |
| 131 | Fungicide A | Fungicide B | Thiophanate methyl | Tebuconazole |
| 132 | Fungicide A | Fungicide B | Thiophanate methyl | Tetraconazole |
| 133 | Fungicide A | Fungicide B | Thiophanate methyl | Prothioconazole |
| 134 | Fungicide A | Fungicide B | Thiophanate methyl | Azoxystrobin |
| 135 | Fungicide A | Fungicide B | Thiophanate methyl | Picoxystrobin |
| 136 | Fungicide A | Fungicide B | Thiophanate methyl | Pyraclostrobin |
| 137 | Fungicide A | Fungicide B | Thiophanate methyl | Kresoxim-methyl |
| 138 | Fungicide A | Fungicide B | Thiophanate methyl | Benomyl |
| 139 | Fungicide A | Fungicide B | Thiophanate methyl | Carbendazim |
| 140 | Fungicide A | Fungicide B | Thiophanate methyl | Metalaxyl/Metalaxyl-M |
| 141 | Fungicide A | Fungicide B | Thiophanate methyl | Zoxamide |
| 142 | Fungicide A | Fungicide B | Thiophanate methyl | Fluopicolide |
| 143 | Fungicide A | Fungicide B | Thiophanate methyl | Phenamacril |
| 144 | Fungicide A | Fungicide B | Thiophanate methyl | Cyazofamid |
| 145 | Fungicide A | Fungicide B | Thiophanate methyl | Amisulbrom |
| 146 | Fungicide A | Fungicide B | Thiophanate methyl | Tricyclazole |
| 147 | Fungicide A | Fungicide B | Thiophanate methyl | Oxathiapiprolin |
| 148 | Fungicide A | Fungicide B | Thiophanate methyl | Picarbutrazox |
| 149 | Fungicide A | Fungicide B | Zoxamide | Cyproconazole |
| 150 | Fungicide A | Fungicide B | Zoxamide | Difenoconazole |
| 151 | Fungicide A | Fungicide B | Zoxamide | Epoxiconazole |
| 152 | Fungicide A | Fungicide B | Zoxamide | Hexaconazole |
| 153 | Fungicide A | Fungicide B | Zoxamide | Tebuconazole |
| 154 | Fungicide A | Fungicide B | Zoxamide | Tetraconazole |
| 155 | Fungicide A | Fungicide B | Zoxamide | Prothioconazole |
| 156 | Fungicide A | Fungicide B | Zoxamide | Azoxystrobin |
| 157 | Fungicide A | Fungicide B | Zoxamide | Picoxystrobin |
| 158 | Fungicide A | Fungicide B | Zoxamide | Pyraclostrobin |
| 159 | Fungicide A | Fungicide B | Zoxamide | Kresoxim-methyl |
| 160 | Fungicide A | Fungicide B | Zoxamide | Benomyl |
| 161 | Fungicide A | Fungicide B | Zoxamide | Carbendazim |
| 162 | Fungicide A | Fungicide B | Zoxamide | Metalaxyl/Metalaxyl-M |
| 163 | Fungicide A | Fungicide B | Zoxamide | Thiophanate methyl |
| 164 | Fungicide A | Fungicide B | Zoxamide | Fluopicolide |
| 165 | Fungicide A | Fungicide B | Zoxamide | Phenamacril |
| 166 | Fungicide A | Fungicide B | Zoxamide | Cyazofamid |
| 167 | Fungicide A | Fungicide B | Zoxamide | Amisulbrom |
| 168 | Fungicide A | Fungicide B | Zoxamide | Tricyclazole |
| 169 | Fungicide A | Fungicide B | Zoxamide | Oxathiapiprolin |
| 170 | Fungicide A | Fungicide B | Zoxamide | Picarbutrazox |
| 171 | Fungicide A | Fungicide B | Fluopicolide | Cyproconazole |
| 172 | Fungicide A | Fungicide B | Fluopicolide | Difenoconazole |
| 173 | Fungicide A | Fungicide B | Fluopicolide | Epoxiconazole |

| S No. | A | B | C | D |
|---|---|---|---|---|
| 174 | Fungicide A | Fungicide B | Fluopicolide | Hexaconazole |
| 175 | Fungicide A | Fungicide B | Fluopicolide | Tebuconazole |
| 176 | Fungicide A | Fungicide B | Fluopicolide | Tetraconazole |
| 177 | Fungicide A | Fungicide B | Fluopicolide | Prothioconazole |
| 178 | Fungicide A | Fungicide B | Fluopicolide | Azoxystrobin |
| 179 | Fungicide A | Fungicide B | Fluopicolide | Picoxystrobin |
| 180 | Fungicide A | Fungicide B | Fluopicolide | Pyraclostrobin |
| 181 | Fungicide A | Fungicide B | Fluopicolide | Kresoxim-methyl |
| 182 | Fungicide A | Fungicide B | Fluopicolide | Benomyl |
| 183 | Fungicide A | Fungicide B | Fluopicolide | Carbendazim |
| 184 | Fungicide A | Fungicide B | Fluopicolide | Metalaxyl/Metalaxyl-M |
| 185 | Fungicide A | Fungicide B | Fluopicolide | Thiophanate methyl |
| 186 | Fungicide A | Fungicide B | Fluopicolide | Zoxamide |
| 187 | Fungicide A | Fungicide B | Fluopicolide | Phenamacril |
| 188 | Fungicide A | Fungicide B | Fluopicolide | Cyazofamid |
| 189 | Fungicide A | Fungicide B | Fluopicolide | Amisulbrom |
| 190 | Fungicide A | Fungicide B | Fluopicolide | Tricyclazole |
| 191 | Fungicide A | Fungicide B | Fluopicolide | Oxathiapiprolin |
| 192 | Fungicide A | Fungicide B | Fluopicolide | Picarbutrazox |
| 193 | Fungicide A | Fungicide B | Phenamacril | Cyproconazole |
| 194 | Fungicide A | Fungicide B | Phenamacril | Difenoconazole |
| 195 | Fungicide A | Fungicide B | Phenamacril | Epoxiconazole |
| 196 | Fungicide A | Fungicide B | Phenamacril | Hexaconazole |
| 197 | Fungicide A | Fungicide B | Phenamacril | Tebuconazole |
| 198 | Fungicide A | Fungicide B | Phenamacril | Tetraconazole |
| 199 | Fungicide A | Fungicide B | Phenamacril | Prothioconazole |
| 200 | Fungicide A | Fungicide B | Phenamacril | Azoxystrobin |
| 201 | Fungicide A | Fungicide B | Phenamacril | Picoxystrobin |
| 202 | Fungicide A | Fungicide B | Phenamacril | Pyraclostrobin |
| 203 | Fungicide A | Fungicide B | Phenamacril | Kresoxim-methyl |
| 204 | Fungicide A | Fungicide B | Phenamacril | Benomyl |
| 205 | Fungicide A | Fungicide B | Phenamacril | Carbendazim |
| 206 | Fungicide A | Fungicide B | Phenamacril | Metalaxyl/Metalaxyl-M |
| 207 | Fungicide A | Fungicide B | Phenamacril | Thiophanate methyl |
| 208 | Fungicide A | Fungicide B | Phenamacril | Zoxamide |
| 209 | Fungicide A | Fungicide B | Phenamacril | Fluopicolide |
| 210 | Fungicide A | Fungicide B | Phenamacril | Cyazofamid |
| 211 | Fungicide A | Fungicide B | Phenamacril | Amisulbrom |
| 212 | Fungicide A | Fungicide B | Phenamacril | Tricyclazole |
| 213 | Fungicide A | Fungicide B | Phenamacril | Oxathiapiprolin |
| 214 | Fungicide A | Fungicide B | Phenamacril | Picarbutrazox |
| 215 | Fungicide A | Fungicide B | Cyazofamid | Cyproconazole |
| 216 | Fungicide A | Fungicide B | Cyazofamid | Difenoconazole |
| 217 | Fungicide A | Fungicide B | Cyazofamid | Epoxiconazole |
| 218 | Fungicide A | Fungicide B | Cyazofamid | Hexaconazole |
| 219 | Fungicide A | Fungicide B | Cyazofamid | Tebuconazole |
| 220 | Fungicide A | Fungicide B | Cyazofamid | Tetraconazole |
| 221 | Fungicide A | Fungicide B | Cyazofamid | Prothioconazole |
| 222 | Fungicide A | Fungicide B | Cyazofamid | Azoxystrobin |
| 223 | Fungicide A | Fungicide B | Cyazofamid | Picoxystrobin |
| 224 | Fungicide A | Fungicide B | cyazofamid | Pyraclostrobin |
| 225 | Fungicide A | Fungicide B | Cyazofamid | Kresoxim-methyl |
| 226 | Fungicide A | Fungicide B | Cyazofamid | Benomyl |
| 227 | Fungicide A | Fungicide B | Cyazofamid | Carbendazim |
| 228 | Fungicide A | Fungicide B | Cyazofamid | Metalaxyl/Metalaxyl-M |
| 229 | Fungicide A | Fungicide B | Cyazofamid | Thiophanate methyl |
| 230 | Fungicide A | Fungicide B | Cyazofamid | Zoxamide |
| 231 | Fungicide A | Fungicide B | Cyazofamid | Fluopicolide |
| 232 | Fungicide A | Fungicide B | Cyazofamid | Phenamacril |
| 233 | Fungicide A | Fungicide B | Cyazofamid | Amisulbrom |
| 234 | Fungicide A | Fungicide B | Cyazofamid | Tricyclazole |
| 235 | Fungicide A | Fungicide B | Cyazofamid | Oxathiapiprolin |
| 236 | Fungicide A | Fungicide B | Cyazofamid | Picarbutrazox |
| 237 | Fungicide A | Fungicide B | Amisulbrom | Cyproconazole |
| 238 | Fungicide A | Fungicide B | Amisulbrom | Difenoconazole |
| 239 | Fungicide A | Fungicide B | Amisulbrom | Epoxiconazole |
| 240 | Fungicide A | Fungicide B | Amisulbrom | Hexaconazole |
| 241 | Fungicide A | Fungicide B | Amisulbrom | Tebuconazole |
| 242 | Fungicide A | Fungicide B | Amisulbrom | Tetraconazole |
| 243 | Fungicide A | Fungicide B | Amisulbrom | Prothioconazole |
| 244 | Fungicide A | Fungicide B | Amisulbrom | Azoxystrobin |
| 245 | Fungicide A | Fungicide B | Amisulbrom | Picoxystrobin |
| 246 | Fungicide A | Fungicide B | Amisulbrom | Pyraclostrobin |
| 247 | Fungicide A | Fungicide B | Amisulbrom | Kresoxim-methyl |
| 248 | Fungicide A | Fungicide B | Amisulbrom | Benomyl |
| 249 | Fungicide A | Fungicide B | Amisulbrom | Metalaxyl/Metalaxyl-M |
| 250 | Fungicide A | Fungicide B | Amisulbrom | Carbendazim |
| 251 | Fungicide A | Fungicide B | Amisulbrom | Thiophanate methyl |
| 252 | Fungicide A | Fungicide B | Amisulbrom | Zoxamide |
| 253 | Fungicide A | Fungicide B | Amisulbrom | Fluopicolide |
| 254 | Fungicide A | Fungicide B | Amisulbrom | Cyazofamid |
| 255 | Fungicide A | Fungicide B | Amisulbrom | Tricyclazole |
| 256 | Fungicide A | Fungicide B | Amisulbrom | Oxathiapiprolin |
| 257 | Fungicide A | Fungicide B | Amisulbrom | Picarbutrazox |
| 258 | Fungicide A | Fungicide B | Tricyclazole | Cyproconazole |
| 259 | Fungicide A | Fungicide B | Tricyclazole | Difenoconazole |
| 260 | Fungicide A | Fungicide B | Tricyclazole | Epoxiconazole |
| 261 | Fungicide A | Fungicide B | Tricyclazole | Hexaconazole |
| 262 | Fungicide A | Fungicide B | Tricyclazole | Tebuconazole |
| 263 | Fungicide A | Fungicide B | Tricyclazole | Tetraconazole |
| 264 | Fungicide A | Fungicide B | Tricyclazole | Prothioconazole |
| 265 | Fungicide A | Fungicide B | Tricyclazole | Azoxystrobin |
| 266 | Fungicide A | Fungicide B | Tricyclazole | Picoxystrobin |
| 267 | Fungicide A | Fungicide B | Tricyclazole | Pyraclostrobin |
| 268 | Fungicide A | Fungicide B | Tricyclazole | Kresoxim-methyl |
| 269 | Fungicide A | Fungicide B | Tricyclazole | Benomyl |
| 270 | Fungicide A | Fungicide B | Tricyclazole | Carbendazim |
| 271 | Fungicide A | Fungicide B | Tricyclazole | Metalaxyl/Metalaxyl-M |
| 272 | Fungicide A | Fungicide B | Tricyclazole | Thiophanate methyl |
| 273 | Fungicide A | Fungicide B | Tricyclazole | Zoxamide |
| 274 | Fungicide A | Fungicide B | Tricyclazole | Fluopicolide |
| 275 | Fungicide A | Fungicide B | Tricyclazole | Cyazofamid |
| 276 | Fungicide A | Fungicide B | Tricyclazole | Amisulbrom |
| 277 | Fungicide A | Fungicide B | Tricyclazole | Oxathiapiprolin |
| 278 | Fungicide A | Fungicide B | Tricyclazole | Picarbutrazox |
| 279 | Fungicide A | Fungicide B | Picarbutrazox | Cyproconazole |
| 280 | Fungicide A | Fungicide B | Picarbutrazox | Difenoconazole |
| 281 | Fungicide A | Fungicide B | Picarbutrazox | Epoxiconazole |
| 282 | Fungicide A | Fungicide B | Picarbutrazox | Hexaconazole |
| 283 | Fungicide A | Fungicide B | Picarbutrazox | Tebuconazole |
| 284 | Fungicide A | Fungicide B | Picarbutrazox | Tetraconazole |
| 285 | Fungicide A | Fungicide B | Picarbutrazox | Prothioconazole |
| 286 | Fungicide A | Fungicide B | Picarbutrazox | Azoxystrobin |
| 287 | Fungicide A | Fungicide B | Picarbutrazox | Picoxystrobin |
| 288 | Fungicide A | Fungicide B | Picarbutrazox | Pyraclostrobin |
| 289 | Fungicide A | Fungicide B | Picarbutrazox | Kresoxim-methyl |
| 290 | Fungicide A | Fungicide B | Picarbutrazox | Benomyl |
| 291 | Fungicide A | Fungicide B | Picarbutrazox | Carbendazim |
| 292 | Fungicide A | Fungicide B | Picarbutrazox | Metalaxyl/Metalaxyl-M |
| 293 | Fungicide A | Fungicide B | Picarbutrazox | Thiophanate methyl |
| 294 | Fungicide A | Fungicide B | Picarbutrazox | Zoxamide |
| 295 | Fungicide A | Fungicide B | Picarbutrazox | Fluopicolide |
| 296 | Fungicide A | Fungicide B | Picarbutrazox | Cyazofamid |
| 297 | Fungicide A | Fungicide B | Picarbutrazox | Amisulbrom |
| 298 | Fungicide A | Fungicide B | Picarbutrazox | Oxathiapiprolin |
| 299 | Fungicide A | Fungicide B | Oxathiapiprolin | Cyproconazole |
| 300 | Fungicide A | Fungicide B | Oxathiapiprolin | Difenoconazole |
| 301 | Fungicide A | Fungicide B | Oxathiapiprolin | Epoxiconazole |
| 302 | Fungicide A | Fungicide B | Oxathiapiprolin | Hexaconazole |
| 303 | Fungicide A | Fungicide B | Oxathiapiprolin | Tebuconazole |
| 304 | Fungicide A | Fungicide B | Oxathiapiprolin | Tetraconazole |
| 305 | Fungicide A | Fungicide B | Oxathiapiprolin | Prothioconazole |
| 306 | Fungicide A | Fungicide B | Oxathiapiprolin | Azoxystrobin |
| 307 | Fungicide A | Fungicide B | Oxathiapiprolin | Picoxystrobin |

| S No. | A | B | C | D |
|---|---|---|---|---|
| 308 | Fungicide A | Fungicide B | Oxathiapiprolin | Pyraclostrobin |
| 309 | Fungicide A | Fungicide B | Oxathiapiprolin | Kresoxim-methyl |
| 310 | Fungicide A | Fungicide B | Oxathiapiprolin | Benomyl |
| 311 | Fungicide A | Fungicide B | Oxathiapiprolin | Carbendazim |
| 312 | Fungicide A | Fungicide B | Oxathiapiprolin | Metalaxyl/Metalaxyl-M |
| 313 | Fungicide A | Fungicide B | Oxathiapiprolin | Thiophanate methyl |
| 314 | Fungicide A | Fungicide B | Oxathiapiprolin | Zoxamide |
| 315 | Fungicide A | Fungicide B | Oxathiapiprolin | Fluopicolide |
| 316 | Fungicide A | Fungicide B | Oxathiapiprolin | Cyazofamid |
| 317 | Fungicide A | Fungicide B | Oxathiapiprolin | Amisulbrom |
| 318 | Fungicide A | Fungicide B | Oxathiapiprolin | Picarbutrazox |

In all the embodiments 1-318 described herein in the above table, the fungicide A may be present or may be absent altogether from the combinations. However, the presence of fungicide B is essential according to the present invention.

In an embodiment of the combinations of the present invention, the preferred multisite fungicide is captan.

In an embodiment, the combinations of the present invention include the following preferred combinations:

| S No. | I | II | III | IV |
|---|---|---|---|---|
| 319 | Mancozeb | Captan | Cyproconazole | — |
| 320 | Mancozeb | Captan | Difenoconazole | — |
| 321 | Mancozeb | Captan | Epoxiconazole | — |
| 322 | Mancozeb | Captan | Hexaconazole | — |
| 323 | Mancozeb | Captan | Tebuconazole | — |
| 324 | Mancozeb | Captan | Tetraconazole | — |
| 325 | Mancozeb | Captan | Prothioconazole | — |
| 326 | Mancozeb | Captan | — | Azoxystrobin |
| 327 | Mancozeb | Captan | — | Picoxystrobin |
| 328 | Mancozeb | Captan | — | Pyraclostrobin |
| 329 | Mancozeb | Captan | — | Kresoxim-methyl |
| 330 | Mancozeb | Captan | — | Trifloxystrobin |
| 331 | Mancozeb | Captan | Cyproconazole | Azoxystrobin |
| 332 | Mancozeb | Captan | Cyproconazole | Picoxystrobin |
| 333 | Mancozeb | Captan | Cyproconazole | Pyraclostrobin |
| 334 | Mancozeb | Captan | Cyproconazole | Kresoxim-methyl |
| 335 | Mancozeb | Captan | Cyproconazole | Trifloxystrobin |
| 336 | Mancozeb | Captan | Difenoconazole | Azoxystrobin |
| 337 | Mancozeb | Captan | Difenoconazole | Picoxystrobin |
| 338 | Mancozeb | Captan | Difenoconazole | Pyraclostrobin |
| 339 | Mancozeb | Captan | Difenoconazole | Kresoxim-methyl |
| 340 | Mancozeb | Captan | Difenoconazole | Trifloxystrobin |
| 341 | Mancozeb | Captan | Epoxiconazole | Azoxystrobin |
| 342 | Mancozeb | Captan | Epoxiconazole | Picoxystrobin |
| 343 | Mancozeb | Captan | Epoxiconazole | Pyraclostrobin |
| 344 | Mancozeb | Captan | Epoxiconazole | Kresoxim-methyl |
| 345 | Mancozeb | Captan | Epoxiconazole | Trifloxystrobin |
| 346 | Mancozeb | Captan | Hexaconazole | Azoxystrobin |
| 347 | Mancozeb | Captan | Hexaconazole | Picoxystrobin |
| 348 | Mancozeb | Captan | Hexaconazole | Pyraclostrobin |
| 349 | Mancozeb | Captan | Hexaconazole | Kresoxim-methyl |
| 350 | Mancozeb | Captan | Hexaconazole | Trifloxystrobin |
| 351 | Mancozeb | Captan | Tebuconazole | Azoxystrobin |
| 352 | Mancozeb | Captan | Tebuconazole | Picoxystrobin |
| 353 | Mancozeb | Captan | Tebuconazole | Pyraclostrobin |
| 354 | Mancozeb | Captan | Tebuconazole | Kresoxim-methyl |
| 355 | Mancozeb | Captan | Tebuconazole | Trifloxystrobin |
| 356 | Mancozeb | Captan | Tetraconazole | Azoxystrobin |
| 357 | Mancozeb | Captan | Tetraconazole | Picoxystrobin |
| 358 | Mancozeb | Captan | Tetraconazole | Pyraclostrobin |
| 359 | Mancozeb | Captan | Tetraconazole | Kresoxim-methyl |
| 360 | Mancozeb | Captan | Tetraconazole | Trifloxystrobin |
| 361 | Mancozeb | Captan | Prothioconazole | Azoxystrobin |
| 362 | Mancozeb | Captan | Prothioconazole | Picoxystrobin |
| 363 | Mancozeb | Captan | Prothioconazole | Pyraclostrobin |
| 364 | Mancozeb | Captan | Prothioconazole | Kresoxim-methyl |
| 365 | Mancozeb | Captan | Prothioconazole | Trifloxystrobin |

In all the embodiments 319-365 described herein in the above table, mancozeb may be present or may be absent altogether from the combinations. However, the presence of captan is essential according to the present invention.

In an embodiment of the combinations of the present invention, the preferred multisite fungicide is captafol.

In an embodiment, the combinations of the present invention include the following preferred combinations:

| S No. | I | II | III | IV |
|---|---|---|---|---|
| 366 | Mancozeb | Captafol | Cyproconazole | — |
| 367 | Mancozeb | Captafol | Difenoconazole | — |
| 368 | Mancozeb | Captafol | Epoxiconazole | — |
| 369 | Mancozeb | Captafol | Hexaconazole | — |
| 370 | Mancozeb | Captafol | Tebuconazole | — |
| 371 | Mancozeb | Captafol | Tetraconazole | — |
| 372 | Mancozeb | Captafol | Prothioconazole | — |
| 373 | Mancozeb | Captafol | — | Azoxystrobin |
| 374 | Mancozeb | Captafol | — | Picoxystrobin |
| 375 | Mancozeb | Captafol | — | Pyraclostrobin |
| 376 | Mancozeb | Captafol | — | Kresoxim-methyl |
| 377 | Mancozeb | Captafol | — | Trifloxystrobin |
| 378 | Mancozeb | Captafol | Cyproconazole | Azoxystrobin |
| 379 | Mancozeb | Captafol | Cyproconazole | Picoxystrobin |
| 380 | Mancozeb | Captafol | Cyproconazole | Pyraclostrobin |
| 381 | Mancozeb | Captafol | Cyproconazole | Kresoxim-methyl |
| 382 | Mancozeb | Captafol | Cyproconazole | Trifloxystrobin |
| 383 | Mancozeb | Captafol | Difenoconazole | Azoxystrobin |
| 384 | Mancozeb | Captafol | Difenoconazole | Picoxystrobin |
| 385 | Mancozeb | Captafol | Difenoconazole | Pyraclostrobin |
| 386 | Mancozeb | Captafol | Difenoconazole | Kresoxim-methyl |
| 387 | Mancozeb | Captafol | Difenoconazole | Trifloxystrobin |
| 388 | Mancozeb | Captafol | Epoxiconazole | Azoxystrobin |
| 389 | Mancozeb | Captafol | Epoxiconazole | Picoxystrobin |
| 390 | Mancozeb | Captafol | Epoxiconazole | Pyraclostrobin |
| 391 | Mancozeb | Captafol | Epoxiconazole | Kresoxim-methyl |
| 392 | Mancozeb | Captafol | Epoxiconazole | Trifloxystrobin |
| 393 | Mancozeb | Captafol | Hexaconazole | Azoxystrobin |
| 394 | Mancozeb | Captafol | Hexaconazole | Picoxystrobin |
| 395 | Mancozeb | Captafol | Hexaconazole | Pyraclostrobin |
| 396 | Mancozeb | Captafol | Hexaconazole | Kresoxim-methyl |
| 397 | Mancozeb | Captafol | Hexaconazole | Trifloxystrobin |
| 398 | Mancozeb | Captafol | Tebuconazole | Azoxystrobin |
| 399 | Mancozeb | Captafol | Tebuconazole | Picoxystrobin |
| 400 | Mancozeb | Captafol | Tebuconazole | Pyraclostrobin |
| 401 | Mancozeb | Captafol | Tebuconazole | Kresoxim-methyl |
| 402 | Mancozeb | Captafol | Tebuconazole | Trifloxystrobin |
| 403 | Mancozeb | Captafol | Tetraconazole | Azoxystrobin |
| 404 | Mancozeb | Captafol | Tetraconazole | Picoxystrobin |
| 405 | Mancozeb | Captafol | Tetraconazole | Pyraclostrobin |
| 406 | Mancozeb | Captafol | Tetraconazole | Kresoxim-methyl |
| 407 | Mancozeb | Captafol | Tetraconazole | Trifloxystrobin |
| 408 | Mancozeb | Captafol | Prothioconazole | Azoxystrobin |
| 409 | Mancozeb | Captafol | Prothioconazole | Picoxystrobin |

-continued

| S No. | I | II | III | IV |
|---|---|---|---|---|
| 410 | Mancozeb | Captafol | Prothioconazole | Pyraclostrobin |
| 411 | Mancozeb | Captafol | Prothioconazole | Kresoxim-methyl |
| 412 | Mancozeb | Captafol | Prothioconazole | Trifloxystrobin |

In all the embodiments 366-412 described herein in the above table, mancozeb may be present or may be absent altogether from the combinations. However, the presence of captafol is essential according to the present invention.

In an embodiment of the combinations to be used in the methods of the present invention, the preferred multisite fungicide is folpet.

In an embodiment, the combinations of the present invention include the following preferred combinations:

| S No. | I | II | III | IV |
|---|---|---|---|---|
| 413 | Mancozeb | Folpet | Cyproconazole | — |
| 414 | Mancozeb | Folpet | Difenoconazole | — |
| 415 | Mancozeb | Folpet | Epoxiconazole | — |
| 416 | Mancozeb | Folpet | Hexaconazole | — |
| 417 | Mancozeb | Folpet | Tebuconazole | — |
| 418 | Mancozeb | Folpet | Tetraconazole | — |
| 419 | Mancozeb | Folpet | Prothioconazole | — |
| 420 | Mancozeb | Folpet | — | Azoxystrobin |
| 421 | Mancozeb | Folpet | — | Picoxystrobin |
| 422 | Mancozeb | Folpet | — | Pyraclostrobin |
| 423 | Mancozeb | Folpet | — | Kresoxim-methyl |
| 424 | Mancozeb | Folpet | — | Trifloxystrobin |
| 425 | Mancozeb | Folpet | Cyproconazole | Azoxystrobin |
| 426 | Mancozeb | Folpet | Cyproconazole | Picoxystrobin |
| 427 | Mancozeb | Folpet | Cyproconazole | Pyraclostrobin |
| 428 | Mancozeb | Folpet | Cyproconazole | Kresoxim-methyl |
| 429 | Mancozeb | Folpet | Cyproconazole | Trifloxystrobin |
| 430 | Mancozeb | Folpet | Difenoconazole | Azoxystrobin |
| 431 | Mancozeb | Folpet | Difenoconazole | Picoxystrobin |
| 432 | Mancozeb | Folpet | Difenoconazole | Pyraclostrobin |
| 433 | Mancozeb | Folpet | Difenoconazole | Kresoxim-methyl |
| 434 | Mancozeb | Folpet | Difenoconazole | Trifloxystrobin |
| 435 | Mancozeb | Folpet | Epoxiconazole | Azoxystrobin |
| 436 | Mancozeb | Folpet | Epoxiconazole | Picoxystrobin |
| 437 | Mancozeb | Folpet | Epoxiconazole | Pyraclostrobin |
| 438 | Mancozeb | Folpet | Epoxiconazole | Kresoxim-methyl |
| 439 | Mancozeb | Folpet | Epoxiconazole | Trifloxystrobin |
| 440 | Mancozeb | Folpet | Hexaconazole | Azoxystrobin |
| 441 | Mancozeb | Folpet | Hexaconazole | Picoxystrobin |
| 442 | Mancozeb | Folpet | Hexaconazole | Pyraclostrobin |
| 443 | Mancozeb | Folpet | Hexaconazole | Kresoxim-methyl |
| 444 | Mancozeb | Folpet | Hexaconazole | Trifloxystrobin |
| 445 | Mancozeb | Folpet | Tebuconazole | Azoxystrobin |
| 446 | Mancozeb | Folpet | Tebuconazole | Picoxystrobin |
| 447 | Mancozeb | Folpet | Tebuconazole | Pyraclostrobin |
| 448 | Mancozeb | Folpet | Tebuconazole | Kresoxim-methyl |
| 449 | Mancozeb | Folpet | Tebuconazole | Trifloxystrobin |
| 450 | Mancozeb | Folpet | Tetraconazole | Azoxystrobin |
| 451 | Mancozeb | Folpet | Tetraconazole | Picoxystrobin |
| 451 | Mancozeb | Folpet | Tetraconazole | Pyraclostrobin |
| 452 | Mancozeb | Folpet | Tetraconazole | Kresoxim-methyl |
| 453 | Mancozeb | Folpet | Tetraconazole | Trifloxystrobin |
| 454 | Mancozeb | Folpet | Prothioconazole | Azoxystrobin |
| 455 | Mancozeb | Folpet | Prothioconazole | Picoxystrobin |
| 456 | Mancozeb | Folpet | Prothioconazole | Pyraclostrobin |
| 457 | Mancozeb | Folpet | Prothioconazole | Kresoxim-methyl |
| 458 | Mancozeb | Folpet | Prothioconazole | Trifloxystrobin |

In all the embodiments 413-458 described herein in the above table, mancozeb may be present or may be absent altogether from the combinations. However, the presence of folpet is essential according to the present invention.

In an embodiment, the combinations for use in the treatment of zymoseptoria infection in cereal plants comprise:
 (a) at least one phthalimide fungicide and;
 (b) agrochemically acceptable excipient.

In an embodiment, the combinations for use in the treatment of zymoseptoria infection in cereal plants comprise:
 (a) at least one phthalimide fungicide selected from selected from folpet, captfol, or captan; and;
 (b) agrochemically acceptable excipient.

In an embodiment, the combinations for use in the methods of the present invention comprise:
 (a) at least one phthalimide fungicide;
 (b) optionally, at least one dithiocarbamate fungicide;
 (c) at least one quinone outside inhibitor; and
 (d) at least one agrochemically acceptable excipient.

In an embodiment, the combinations for use in the methods of the present invention comprise:
 (a) at least one phthalimide fungicide;
 (b) optionally, at least one dithiocarbamate fungicide;
 (c) at least one ergostrol biosynthesis inhibitor; and
 (d) at least one agrochemically acceptable excipient.

In an embodiment, the combinations for use in the methods of the present invention comprise:
 (a) at least one phthalimide fungicide;
 (b) optionally, at least one dithiocarbamate fungicide;
 (c) at least one quinone outside inhibitor;
 (d) at least one ergostrol biosynthesis inhibitor; and
 (e) at least one agrochemically acceptable excipient.

The amount of a composition according to the invention to be applied, will depend on various factors, such as the subject of the treatment, such as, for example plants, soil or seeds; the type of treatment, such as, for example spraying, dusting or seed dressing; the purpose of the treatment, such as, for example prophylactic or therapeutic disease control; in case of disease control the type of fungi to be controlled or the application time. This amount of the combinations of the present invention to be applied can be readily deduced by a skilled agronomist.

Thus in an embodiment, the present invention may provide the combinations for use in the methods of the present invention comprising:
 (a) at least one phthalimide fungicide selected from folpet, captfol, or captan;
 (b) at least one quinone outside inhibitor, and/or at least one ergostrol biosynthesis inhibitor; and
 (c) optionally, at last one dithiocarbamate fungicide.

In an embodiment, the constituents of the composition for use in the methods of the present invention may be tank mixed and sprayed at the locus of the infection, or may be alternatively be mixed with surfactants and then sprayed.

In an embodiment, the constituents of the composition for use in the methods of the present invention may be used for foliar application, ground or applications to plant propagation materials.

In an embodiment, the compositions for use in the methods of the present invention may typically be produce by mixing the actives in the composition with an inert carrier, and adding surfactants and other adjuvants and carriers as needed and formulated into solid, or liquid formulations, including but not limited to wettable powders, water dispersible granules (WDG), dusts, Soluble (liquid) concentrates, suspension concentrates (SC), oil in water emulsion, water in oil emulsion, emulsifiable concentrates, capsule suspensions, ZC formulations, oil dispersions or other known formulation types. The composition may also be used for treatment of a plant propagation material such as seeds etc.

Depending on the formulation type, they comprise one or more liquid or solid carriers, if appropriate surfactants (such as dispersants, protective colloids, emulsifiers, wetting agents and tackifiers), and if appropriate further auxiliaries which are customary for formulating crop protection products. The person skilled in the art is sufficiently familiar with the recipes for such formulations. Further auxiliaries include e.g. organic and inorganic thickeners, bactericides, antifreeze agents, antifoams, colorants and, for seed formulations, adhesives.

Suitable carriers include liquid and solid carriers. Examples of the solid carrier used in formulation include fine powders or granules such as minerals such as kaolin clay, attapulgite clay, bentonite, montmorillonite, acid white clay, pyrophyllite, talc, diatomaceous earth and calcite; natural organic materials such as corn rachis powder and walnut husk powder; synthetic organic materials such as urea; salts such as calcium carbonate and ammonium sulfate; synthetic inorganic materials such as synthetic hydrated silicon oxide and the like. The liquid carrier include, aromatic hydrocarbons such as xylene, alkylbenzene and methylnaphthalene; alcohols such as 2-propanol, ethyleneglycol, propylene glycol, and ethylene glycol monoethyl ether; ketones such as acetone, cyclohexanone and isophorone; vegetable oil such as soybean oil and cotton seed oil; petroleum aliphatic hydrocarbons, esters, dimethylsulfoxide, acetonitrile and water and the like.

Examples of the surfactant include anionic surfactants such as alkyl sulfate ester salts, alkylaryl sulfonate salts, dialkyl sulfosuccinate salts, polyoxyethylene alkylaryl ether phosphate ester salts, lignosulfonate salts and naphthalene sulfonate formaldehyde polycondensates; and nonionic surfactants such as polyoxyethylene alkyl aryl ethers, polyoxyethylene alkylpolyoxypropylene block copolymers and sorbitan fatty acid esters and cationic surfactants such as alkyltrimethylammonium salts.

Examples of the other formulation auxiliary agents include water-soluble polymers such as polyvinyl alcohol and polyvinylpyrrolidone, polysaccharides such as Arabic gum, alginic acid and the salt thereof, CMC (carboxymethyl-cellulose), Xanthan gum, inorganic materials such as aluminum magnesium silicate and alumina sol, preservatives, coloring agents and stabilization agents such as PAP (acid phosphate isopropyl) and BHT.

The combinations of the present invention, for use in the methods of the present invention, may be sold as a pre-mix composition or a kit of parts such that individual actives may be mixed before spraying. Alternatively, the kit of parts may contain the phthalimide fungicide and the second and/or third fungicide pre-mixed with an adjuvant such that the two components may be tank mixed before spraying.

In another embodiment, a phthalimide fungicide and a second and/or third fungicide may be pre-mixed admixed with an adjuvant and may be added to a co-pack such that the fungicides may be tank mixed before spraying.

An aspect of the present invention can provide a kit comprising:
an phthalimide component comprising at least one phthalimide fungicide selected from captan, captafol, or folpet; and
a second fungicidal component comprising at least a systemic fungicide or a combination of systemic fungicides.

An aspect of the present invention can provide a kit comprising:
a first fungicidal component comprising at least one multi-site fungicide;
an phthalimide component comprising at least one phthalimide fungicide selected from captan, captafol, or folpet; and
a second fungicidal component comprising at least a systemic fungicide or a combination of systemic fungicides.

Another aspect of the present invention can provide a kit comprising:
a first fungicidal component comprising at least one dithiocarbamate fungicide;
an phthalimide component comprising at least one phthalimide fungicide selected from captan, captafol, or folpet; and
a second fungicidal component comprising at least a systemic fungicide or a combination of systemic fungicides.

Yet another aspect of the present invention can provide a kit comprising:
a fungicidal component comprising at least one multi-site fungicide, preferably a dithiocarbamate fungicide;
a phthalimide component comprising at least one phthalimide fungicide selected from captan, captafol, or folpet; and
a fungicidal component comprising at least a first systemic fungicide; and
a fungicidal component comprising at least a second systemic fungicide.

The composition of the present invention, for use in the methods of the present invention, maybe applied simultaneously as a tank mix or a formulation or may be applied sequentially. The application may be made to the soil before emergence of the plants, either pre-planting or post-planting. The application may be made as a foliar spray at different timings during crop development, with either one or two applications early or late post-emergence.

The compositions according to the invention, for use in the methods of the present invention, can be applied before or after infection of the useful plants or the propagation material thereof by the fungi.

Preferably, as demonstrated, the use of a phthalimide fungicide was found surprisingly efficacious towards the control of *Septoria*. In an embodiment, the phthalimide fungicide may be combined with other fungicide selected from at least one dithiocarbamate fungicide, which are optionally combined with Quinone outside inhibitors and/or ergosterol biosynthesis inhibitors and/or a succinate dehydrogenase inhibitor fungicide, greatly improved the disease control as well as improved yield and demonstrated a synergistic effect.

As demonstrated, the mixing of multi-site phthalimide fungicides with at least another fungicide greatly improved disease and insect pest control, as well as improved yield.

It is surprisingly found that the present compositions comprising a multi-site phthalimide fungicide and in combination with one or more another systemic fungicide were found to possess enhanced control of fungal leaf spot diseases caused by zymoseptoria infections in host plants for example in cereals such as wheat. These compositions are also found to improve the quality of the plant by decreasing stress and improving nutrition levels, thereby increasing the yield of the plant that was infected with a fungicidal infection, especially with *zymoSeptoria tritici* infection.

The examples and tables 1 to 7 represented herein demonstrate the efficacy of the captan and combinations thereof with another fungicides for controlling fungal disease caused by zymoseptoria infections in cereals particularly wheat plants.

The fungal leaf spot diseases include, but not limited to, tan spot, *Septoria*/Stagonospora nodorum blotch (SNB) and *Septoria tritici* blotch (STB).

In an aspect, the present invention provides a fungicidal composition comprising fungicidally effective amount of a multi-site fungicide comprising preferably captan for controlling zymoseptoria *tritici* in a host leguminous plant.

In an aspect, the present invention provides a fungicidal composition comprising fungicidally effective amount of a multi-site fungicide comprising preferably captan for controlling zymoseptoria *tritici* in cereal plants.

In another aspect the present invention provides a fungicidal composition comprising fungicidally effective amount of a multi-site contact fungicide for controlling *Septoria tritici* blotch (STB) in a host leguminous plant.

In another aspect the present invention provides a fungicidal composition comprising fungicidally effective amount of a multi-site contact fungicide for controlling *Septoria tritici* blotch (STB) caused by zymoseptoria *tritici* in a host leguminous plant.

In another aspect the multi-site contact fungicide is phthalimide fungicide.

In an embodiment, the multisite contact fungicide is selected from folpet, captan, captafol or combinations thereof.

In an embodiment, the multisite contact fungicide is captan.

In an embodiment, the multisite contact fungicide is a combination comprising at least one of captan, folpet, or captafol; and at least another multisite contact fungicide as described herein. In this embodiment, the second multisite fungicide is a contact fungicide other than captan, folpet, or captafol.

In another aspect, the present invention provides a fungicidal composition comprising phthalimide fungicide, in particular Captan, and at least an agrochemically acceptable excipient for treating zymoseptoria fungus in a host leguminous plant.

In another aspect, the present invention provides a fungicidal composition comprising phthalimide fungicide, in particular Captan, for treating fungal leaf spot disease caused by zymoseptoria fungus in a host leguminous plant.

In another aspect the present invention provides a fungicidal composition comprising fungicidally effective amount of captan for controlling *Septoria tritici* blotch (STB) caused by zymo*Septoria tritici* on cereal plants.

In another aspect, the present invention provides a fungicidal combination for treating zymoseptoria infection in a host leguminous plant, wherein the combination comprises 1) Captan and
2) at least one another fungicide selected from quinone outside inhibitor, succinate dehydrogenase inhibitor, quinone inside inhibitor or combinations thereof.

In another aspect, the present invention provides a fungicidal composition for treating zymoseptoria infection in a host leguminous plant, wherein the composition comprises 1) Captan and
2) at least one another fungicide selected from quinone outside inhibitor, succinate dehydrogenase inhibitor, quinone inside inhibitor or combinations thereof; and
3) at least one agrochemically acceptable excipient.

In an embodiment the effective amount of captan in the combination is in the range of 40-80% by weight of the composition, preferably, 50-60% by weight of the composition.

In an embodiment effective amount of another fungicide selected from quinone outside inhibitor, succinate dehydrogenase inhibitor, quinone inside inhibitor or combinations thereof, present in the combination is in the range from about 5% to 25% by weight of the composition, preferably, 5% to 20% by weight of the composition, preferably 5% to 15% by weight of the composition, preferably 5% to 10% by weight of the composition.

In one embodiment, the composition comprises captan and prothioconazole.

In an embodiment, the composition comprises 10 to 70% by weight of captan and 5% to 25% by weight of prothioconazole.

Thus, in an embodiment, the present invention provides a method for treating *zymoSeptoria tritici* in a host leguminous plant, wherein the method comprises treating the plant at the locus of the infection with Captan; and concurrently, prior or subsequently to captan, with prothioconazole.

In one embodiment, the composition comprises captan and fluxapyroxad.

In an embodiment, the composition comprises 10 to 70% by weight of captan and 5% to 25% by weight of fluxapyroxad.

In one embodiment, the composition comprises captan, prothioconazole and fluxapyroxad.

In one embodiment, the composition comprises captan and Difenoconazole.

In an embodiment, the composition comprises 10 to 70% by weight of captan and 5% to 25% by weight of Difenoconazole.

Thus, in an embodiment, the present invention provides a method for controlling/treating *zymoSeptoria tritici* in a host leguminous plant, wherein the method comprises treating the plant at the locus of the infection with Captan; and concurrently, prior or subsequently to captan, with difenoconazole.

In one embodiment, the composition comprises captan and Fluoxastrobin or azoxystrobin or combination thereof.

In an embodiment, the composition comprises 10 to 70% by weight of captan and 5% to 25% by weight of fluoxastrobin or azoxystrobin.

In another aspect, the present invention provides the use of multi-site fungicide for controlling zymoseptoria infection in a host plant.

In another aspect, the present invention provides the use of multi-site fungicide for treating fungal leaf spot disease caused by zymoseptoria fungus in a host plant.

In another aspect, the present invention provides the use of multi-site fungicide for treating fungal leaf spot disease caused by zymoseptoria fungus in wheat plants.

In another aspect, the present invention provides the use of multi-site fungicide for controlling zymoseptoria infection in a host plant, when applied subsequently, prior or concurrently to at least another fungicide selected from quinone outside inhibitor, succinate dehydrogenase inhibitor, quinone inside inhibitor or combinations thereof.

In an embodiment, the multisite contact fungicide is selected from folpet, captan or captafol.

In an embodiment, the multisite contact fungicide is captan.

In an embodiment, the multisite contact fungicide is a combination comprising one of captan, folpet, or captafol; and at least another multisite contact fungicide as described herein. In this embodiment, the second multisite fungicide is a contact fungicide other than captan, folpet, or captafol.

In another aspect, the present invention provides a method of treating fungal leaf spot disease in a host plant, which comprises treating the plant at the locus of the infection with Captan; and concurrently, prior or subsequently to captan, with at least one another fungicide selected from a demethylation inhibitor, quinone outside inhibitor, succinate dehydrogenase inhibitor, quinone inside inhibitor or combinations thereof.

It is readily understood that the method of treatment of the present invention may be used on all host plants that are infected by zymoseptoria pathogen. Such exemplary host plants may include cereal plants, their seed or the soil.

Accordingly, the compositions described herein can control a broad spectrum of plant diseases in crops including: cereal grain crops such as wheat, barley, oats, rye, triticale, rice, maize, sorghum and millet; vine crops such as table and wine grapes; field crops such as oilseed rape (canola), sunflower; sugar beets, sugar cane, soybean, peanuts (groundnut), tobacco, alfafa, clover, lespedeza, trefoil and vetch; pome fruits such as apple, pear, crabapple, loquat, mayhaw and quince; stone fruits such as peaches, cherries, plums, apricots, nectarines and almonds; citrus fruits such as lemons, limes, oranges, grapefruit, mandarin (tangerines) and kumquat; root and tuber vegetables and field crops (and their foliage) such as artichoke, garden and sugar beet, carrot, cassaya, ginger, ginseng, horseradish, parsnip, potato, radish, rutabaga, sweet potato, turnip and yam; bulb vegetables such as garlic, leek, onion and shallot; leafy vegetables such as arugula (roquette), celery, celery, cress, endive (escarole), fennel, head and leaf lettuce, parsley, radicchio (red chicory), rhubarb, spinach and Swiss chard; brassica (cole) leafy vegetables such as broccoli, broccoli raab (rapini), Brussels sprouts, cabbage, bok Choy, cauliflower, collards, kale, kohlrabi, mustard and greens; legume vegetables (succulent or dried) such as lupin, bean (*Phaseolus* spp.) (including field bean, kidney bean, lima bean, navy bean, pinto bean, runner bean, snap bean, tepary bean and wax bean), bean (*Vigna* spp.) (including adzuki bean, asparagus bean, blackeyed pea, catjang, Chinese longbean, cowpea, crowder pea, moth bean, mung bean, rice bean, southern pea, urd bean and yardlong bean), broad bean (fava), chickpea (garbanzo), guar, jackbean, lablab bean, lentil and pea (*Pisum* spp.) (including dwarf pea, edible-podded pea, English pea, field pea, garden pea, green pea, snowpea, sugar snap pea, pigeon pea and soybean); fruiting vegetables such as eggplant, groundcherry (*Physalis* spp.), pepino and pepper (including bell pepper, chili pepper, cooking pepper, pimento, sweet pepper; tomatillo and tomato); cucurbit vegetables such as Chayote (fruit), Chinese waxgourd (Chinese preserving melon), citron melon, cucumber, gherkin, edible gourd (including hyotan, cucuzza, hechima, and Chinese okra), *Momordica* spp. (including balsam apple, balsam pear, bittermelon and Chinese cucumber), muskmelon (including cantaloupe and pumpkin), summer and winter squash (including butternut squash, calabaza, hubbard squash, acorn squash, spaghetti squash) and watermelon; berries such as blackberry (including bingleberry, boysenberry, dewberry, lowberry, marionberry, olallieberry and youngberry), blueberry, cranberry, currant, elderberry, gooseberry, huckleberry, loganberry, raspberry and strawberry; tree nuts such as almond, beech nut, Brazil nut, butternut, cashew, chestnut, chinquapin, filbert (hazelnut), hickory nut, macadamia nut, pecan and walnut; tropical fruits and other crops such as bananas, plantains, mangos, coconuts, papaya, guava, avocado, lichee, agave, coffee, cacao, sugar cane, oil palm, sesame, rubber and spices; fiber crops such as cotton, flax and hemp; turfgrasses (including warm- and cool-season turfgrasses) such as bentgrass, Kentucky bluegrass, St. Augustine grass, tall fescue and Bermuda grass.

In further embodiment, the present method comprises treating the cereal plants with a fungicidally effective amount of captan.

In a further embodiment, the method comprises treating cereal seeds with a fungicidally effective amount of captan and at least one another fungicide selected from with at least one another fungicide selected from a demethylation inhibitor, quinone outside inhibitor, succinate dehydrogenase inhibitor, quinone inside inhibitor or combinations thereof.

In an embodiment, the cereal plants comprise wheat and triticale.

The composition of the present invention comprising fungicidally effective amount of captan efficaciously control *Septoria tritici* in cereal plants where DMI and QoI fungicides are found to be resistant.

In a preferred embodiment, the present invention relates to a method for controlling *Septoria tritici* that is resistant to DMI and QoI fungicides fungicides on wheat or triticale, comprising treating the plants, their seed or the soil with a fungicidally effective amount of captan.

In a further preferred embodiment, the method comprises treating the wheat plants or plant propagation material thereof, with a fungicidally effective amount of captan.

As used herein the term "plant propagation material" is to be understood to denote all the generative parts of the plant in particular seeds.

In preferred embodiment, the method comprises treating wheat seeds with a fungicidally effective amount of captan optionally with another funcide selected from with at least one another fungicide selected from a demethylation inhibitor, quinone outside inhibitor, succinate dehydrogenase inhibitor, quinone inside inhibitor or combinations thereof.

In a more preferred embodiment, the present invention relates to a method for controlling *Septoria tritici* that is resistant to DMI fungicides on wheat, comprising treating the plants, their seed or the soil with a fungicidally effective amount of captan.

In a preferred embodiment, the method comprises treating the wheat plants with a fungicidally effective amount of captan.

In another preferred embodiment, the method comprises treating wheat seeds with a fungicidally effective amount of captan.

According to the present invention treating the plants, their seed or the soil in the method according to present invention may be carried out in spray application, in seed treatment, in drip and drench applications, in-furrow applications, on-seed application and overall soil incorporation, chemigation, by addition of the active ingredients to the irrigation water, and in hydroponic/mineral systems.

Typically, according to the present invention, fungicidal effective against *Septoria tritici* means a significant reduction in primary infection by *Septoria tritici*, compared with the untreated plant, for example a significant reduction in the range between about 50-90% compared to an untreated control plant), when compared with the untreated plant (100%).

In a preferred embodiment, the reduction in primary infection by *Septoria tritici*, as compared with the untreated plant is at least 50%, more preferably at least 60%, even more preferably at least 70% when captan is used in fungicidally effective amount.

In an embodiment, the compositions described herein is used to control fungal diseases in wheat plants.

In an embodiment, the effective amount of Captan applied is in the range from about 0.5 kg/ha to 2.5 kg/ha, preferred about 1.5 kg/ha to 2.0 kg/ha.

In an embodiment, Captan may be applied in fungicidally effective amount so as to act as a synergist to the systemic fungicides of the present invention. However, the appropriate amounts of the fungicides used in the present invention, whether multi-site contact fungicides or systemic fungicides, is not particularly limiting and may be conveniently chosen by a skilled artisan.

The method of control of the present invention may be carried out by spraying the suggested tank mixes, or the individual fungicides may be formulated as a kit-of-parts containing various components that may be mixed as instructed prior to spraying.

In an embodiment, the fungicides or the combinations thereof contemplated according to the present invention may be pre-formulated and may be in the form of Water Dispersible Granules (WDG), Wettable Powders, Suspension Concentrates, Emulsifiable Concentrate, Suspoemulsions, Capsule Suspensions etc. However, the choice of any preferred formulation type is not particularly limiting.

In preferred embodiment the composition of the present invention in formulated as suspension concentrate (SC).

In preferred embodiment the suspension concentrates of the present invention comprising captan in an amount in the range of 400 g/L to 800 g/L, preferably 500 g/L.

In an embodiment the effective amount of active ingredient, preferably captan is preferably 40%-80% by weight, in particular 45-50% by weight, more preferably 50%-55% by weight of the total weight of the composition.

In a preferred embodiment, suspension concentrate composition is used for controlling *Septoria titrici* in cereal plants for example wheat plants.

In an embodiment, the amount of Captan used in the composition is varied based on the type of formulation.

In an embodiment, the amount of Captan to be applied in the range from 0.1 L/ha to 5 L/ha, preferred being 0.5 L/ha to 2.5 L/ha.

In preferred embodiment the compositions of the present invention comprising captan in an amount in the range of to be applied may range from 0.2 L/ha to 2.0 L/ha, preferred being 0.5 L/ha to 1.5 L/ha.

Adjuvants and ancillary ingredients may be used to formulate such pre-formulated compositions and may employ wetters, adhesives, dispersants or surfactants and, if appropriate solvent or oil and other agriculturally acceptable additives.

In an embodiment, the present invention thus provides a composition comprising any of the fungicidal combinations such as herein described along with agriculturally acceptable excipients.

It is readily understood that the method of treatment of the present invention may be used on all plants that are infected by *Septoria* family. Such exemplary host plants may include cereal plants for example wheat.

In preferred embodiment there is provided method of treatment of infection caused by *Septoria* in wheat plants.

Typically, the compositions and methods of the present invention are for the treatment and/or controlling the speckled leaf blotch of wheat, Zymoseptoria *tritici*.

In some embodiments, captan may also be used together with fertilizers such as ammonium nitrate, urea, potash, and superphosphate, phytotoxicants and plant growth regulators and safeners. These may be used sequentially or in combination with the above-described compositions, if appropriate also added immediately prior to use (tank mix) and the plant(s) may be sprayed with a composition of this invention either before or after being treated with the fertilizers.

As will be demonstrated in the examples, the multi-site fungicide, for example Captan or its combination with systemic fungicide(s) for the treatment of *Septoria* leaf blotch caused by *zymoSeptoria tritici* on wheat plant greatly affected the disease control as well as improved yield.

The method of the present invention also improves the existing disease control to an unexpectedly high degree and surprisingly improves the yield obtained. The method of the present invention also allows for greater resistance control and decreases the amount of the actives used.

These and other advantages of the invention may become more apparent from the examples set forth herein below. These examples are provided merely as illustrations of the invention and are not intended to be construed as a limitation thereof.

EXAMPLES

Example 1

Formulation of Captan (500 SC)

| INGREDIENTS | AMOUNT (GMS/LIT) |
|---|---|
| Captan | 500 |
| Amine salt of polyarylphenyl ether phosphate | 30 |
| Solvent | 80 |
| Silicon-based organic polymer | 3 |
| Water | Q.S. |
| Total | 1 L |

In the following examples the filed trial is represented on efficacy of captan and its mixtures with another fungicide on wheat *Septoria.*

Example 2

A study was conducted to evaluate efficacy of multi-site fungicide (Captan) on *zymoSeptoria tritici* pathogen. Winter wheat plants cv. Alixan (Limagrain) at the BBCH 12 growth stage were treated with a hand sprayer at 2 bars calibrated to deliver the equivalent of 200 L/ha. Three replicates (pots) of 6 wheat plants each are used for all conditions tested. After treatment, wheat plants are left to dry at room temperature for 1 hour and then placed in a climatic chamber.

Twenty-four hours after treatments, 5-cm fragments of the first leaf are cut and transferred on 90-mm diameter Petri dish containing water agar supplemented with an anti-senescing compound (7 leaf fragments per Petri dish). Leaf fragments are then inoculated with a paint brush dipped into the calibrated pycnospores suspension of *Z. tritici* strain Mg Tri-R6.

After inoculation, Petri dishes are placed in adapted climatic conditions.

Disease assessments are carried out 21 and 28 days post inoculation (dpi) by measuring the length of the necrosis and the total length of the leaf fragment. The intensity of infection is then determined in percent of the total length of the leaf fragment. The values of the intensity of infection obtained are compared by means of the Newman and Keuls test (XL-Stat software, Addinsoft Ltd.).

The most commonly used method for estimating the Area Under the Disease Progress Curve (AUDPC), the trapezoidal method, is performed. The fungicide efficacy was determined from the intensity of infection and the AUDPC values and expressed in percent of the untreated control.

| Formulation | Amount of active | Dose Rates (g a.i./ha) |
| --- | --- | --- |
| Captan 800 WG | 80% a.i./Kg | 800 |
|  |  | 1600 |
| Captan 800 WG | 80% a.i./Kg | 2400 |
|  |  | 3200 |
| Chlorothalonil 500 SC | 500 g./L | 750 |
| Heliosoufre SC | 730 g./L | 4200 |
| Dithane Neotec WG | 75%/Kg | 1600 |
| Control | — | Sterile distilled water |

It was observed that when Captan was applied it showed a very good fungicidal efficacy against Zymoseptoria *tritici* strain Zt Tri-R6, which is Moderately Resistant to DMI fungicides and Highly Resistant to QoI fungicides, at the lowest rate of 800 g/ha.

Indeed, at this rate Captan already exhibits 77% efficiency. At three rates tested (1600, 2400 and 3200 g/ha), Captan almost completely inhibits the development of this Z. *tritici* strain into wheat leaf tissues (FIG. 1).

Example 3

Field Trials on Combination of Commercially Available Captan (500SC) With Another Fungicide A study was conducted to evaluate efficacy of mixtures of Captan with another fungicide on wheat *Septoria*. The combination mixtures were used as follows:

Brief Description of the Results in Accompanying Tables

FIG. 1: Percentage efficacy of Zymoseptoria *tritici* strain Zt Tri-R6, moderately resistant to DMI and Highly resistant to QoI fungicides, on wheat leaf fragments untreated or treated preventively with Captan, Chlorothalonil, Sulphur and Mancozeb in controlled conditions.

TABLE 1

| Active | Dose (g a.i./ha) | Fungicide efficacy against *Zymoseptoria tritici* (% Control) |
|---|---|---|
| Untreated | — | — |
| Captan | 800 | 77.9 |
| Captan | 1600 | 96.0 |
| Captan | 2400 | 97.0 |
| Captan | 3200 | 100 |
| Chlorothalonil | 750 | 69.2 |
| sulphur | 4200 | 65.8 |
| Mancozeb | 1600 | 21.0 |

Table 2: Comparison of the fungicide efficacy, obtained from the AUDPC values, of Difenoconazole (DFZ) used at 25 g/ha straight or in two-way mixtures with Sulfur (S), Captan, Chlorothalonil (CTL), Mancozeb (MCZ) or Folpet and the reference two-way mixture of Epoxiconazole+Folpet towards Zymoseptoria *tritici* strain Zt Tri-R6 moderately resistant to DMI and Highly resistant to QoI fungicides in controlled conditions.

TABLE 2

| Active ingredient (s) | Dose (g a.i./ha) | Fungicide efficacy against *Zymoseptoria tritici* (% Control) |
|---|---|---|
| Untreated | — | — |
| Difenoconazole | 25 | 81.8 |
| Difenoconazole + Captan | 25 + 160 | 93.4 |
| Difenoconazole + Captan | 25 + 240 | 97.5 |
| Difenoconazole + folpet | 25 + 150 | 93.1 |
| Epoxiconazole + folpet | 15 + 112.5 | 98.2 |
| Epoxiconazole + folpet | 20 + 150 | 99.6 |
| Epoxiconazole + folpet | 25 + 187.5 | 100 |

Table 3: Comparison of the fungicide efficacy, obtained from the AUDPC values, of Prothioconazole (DFZ) used at 30 g/ha straight or in two-way mixtures with Sulfur (S), Captan, Chlorothalonil (CTL), Mancozeb (MCZ) or Folpet and the reference two-way mixture of Opus+Folpet towards Zymoseptoria *tritici* strain Zt Tri-R6 moderately resistant to DMI and Highly resistant to QoI fungicides in controlled conditions.

TABLE 3

| Active | Dose (g a.i./ha) | Fungicide efficacy against *Zymoseptoria tritici* (%) |
|---|---|---|
| Untreated | — | — |
| Prothioconazole | 30 | 68.2 |
| Prothioconazole + Sulphur | 30 + 371 | 87.6 |
| Prothioconazole + Captan | 30 + 120 | 97.3 |
| Prothioconazole + Captan | 30 + 180 | 98.3 |
| Prothioconazole + Mancozeb | 30 + 240 | 87.2 |
| Prothioconazole + folpet | 30 + 112.5 | 92.6 |
| Epoxiconazole + folpet | 15 + 112.5 | 98.2 |
| Epoxiconazole + folpet | 20 + 150 | 99.6 |
| Epoxiconazole + folpet | 25 + 187.7 | 100 |

Table 4: Comparison of the fungicide efficacy, obtained from the AUDPC values, of Prothioconazole (DFZ) used at 22.5 g/ha straight or in two-way mixtures with Sulfur (S), Captan, Chlorothalonil (CTL), Mancozeb (Mcz) or Folpet and the reference two-way mixture of Epoxyconazole+Folpet towards Zymoseptoria *tritici* strain Zt Tri-R6 moderately resistant to DMI and Highly resistant to QoI fungicides in controlled conditions.

TABLE 4

| Active | Dose (g a.i./ha) | Fungicide efficacy against *Zymoseptoria tritici* (%) |
|---|---|---|
| Untreated | — | — |
| Prothioconazole | 22.5 | 62.9 |
| Prothioconazole + Captan | 22.5 + 120 | 90.0 |
| Prothioconazole + Captan | 22.5 + 180 | 92.4 |
| Prothioconazole + Mancozeb | 22.5 + 240 | 78.0 |
| Prothioconazole + folpet | 22.5 + 112.5 | 92.2 |
| Epoxiconazole + folpet | 15 + 112.5 | 98.2 |
| Epoxiconazole + folpet | 20 + 150 | 99.6 |
| Epoxiconazole + folpet | 25 + 187.7 | 100 |

Table 5. Comparison of the fungicide efficacy, obtained from the AUDPC values, Sulfur+Copper, GoActive®+sulfur++Cu or captan towards Zymoseptoria *tritici* strain Zt Tri-R6 moderately resistant to DMI and Highly resistant to QoI fungicides in controlled conditions.

TABLE 5

| Active | Dose (g a.i./ha) | Fungicide efficacy against Zymoseptoria tritici (%) |
|---|---|---|
| Untreated | — | 0 |
| Sulphur + copper at 2.7 L/ha | 1728 Sulphur + 216 Copper g/ha | 71.6 |
| GoActiv ® (biostimulant) + Sulphur + copper at 3 L/ha | 282 Sulphur + 219 Copper g/ha | 10.7 |
| Captan SC at 1.6 L/ha | 800 g/Ha | 99.4 |

It was thus found that the Captan alone and combination of Captan with other fungicides is effective for controlling *Septoria tritici*. It was further found that the combination mixtures are better than difenoconazole by itself as no antagonism.

Example 3

Two trials were conducted in Winter wheat/Triticum aestivum (winter), variety ADVISOR, to evaluate the control of Speckled leaf blotch of wheat (Spetoria Titrici) as primary target. All products were applied with a knapsack sprayer using compressed air as the propellant. The sprayer was equipped with a boom and flat fan nozzles, and calibrated to apply a homogeneous spray volume at a constant pressure.

Application method: Application A: At the beginning of disease attack and Application B: Renew the application when new disease attack occurs in the best plots, 3 weeks after application A (at least 2 weeks, at the most 4 weeks). Results are represented in table 6 and table 7.

No adverse effects were noted at any assessment timing throughout the duration of the trials.

Trial 1

TABLE 6

| Treatment No. | Treatment | Rate (L/ha) | Fungicide efficacy against *Zymoseptoria tritici* (% Control) | |
|---|---|---|---|---|
| | | | 28 DA-B | 28 DA-B |
| 1 | Untreated Check | — | 0.0 | 0.0 |
| 2 | Prothioconazole | 0.31 | 31.2 | 28.8 |
| 3 | Captan | 1.8 | 32.4 | 24.5 |
| 6 | Prothioconazole + Captan | 0.41 + 2.5 | 90.06 | 92.0 |
| | Prothioconazole + Captan | 0.31 + 2.5 | 82.8 | 87.8 |
| 7 | Prothioconazole + Captan | 0.41 + 1.8 | 80.9 | 79 |
| | Prothioconazole + Captan | 0.21 + 2.5 | 78.4 | 89.6 |
| 8 | Prothioconazole + Captan | 0.31 + 1.8 | 77.5 | 92.3 |
| | Prothioconazole + Captan | 0.41 + 1.3 | 74.7 | 93.1 |
| 10 | Prothioconazole + Captan | 0.31 + 1.3 | 76.5 | 87.0 |
| | Prothioconazole + Captan | 0.21 + 1.8 | 81.6 | 89.7 |
| 14 | JOAO ® (Prothioconazole EC) | 0.8 | 78.3 | 92.4 |
| 15 | JUVENTUS ® | 1 + 1 | 77 | 85.3 |
| 16 | KANTIK ® | 1.6 | 76.3 | 86.9 |

Trial 2

TABLE 7

| No. | Treatment | Rate/Rate Unit (L/ha) | Fungicide efficacy against *Zymoseptoria tritici* (% Control) | | |
|---|---|---|---|---|---|
| | | | 26 DA-A | 40 DA-A | 40 DA-A |
| 1 | Untreated Check | — | 0.0 | 0.0 | 0.0 |
| 2 | Prothioconazole | 0.31 | 42.3 | 40.7 | 58.4 |
| 3 | Captan | 1.8 | 41.3 | 31.9 | 25.7 |
| 6 | Prothioconazole + Captan | 0.41 + 2.5 | 76.0 | 89.9 | 86.1 |
| 7 | Prothioconazole + Captan | 0.31 + 2.5 | 85.8 | 71.1 | 72.0 |
| 8 | Prothioconazole + Captan | 0.41 + 1.8 | 81.5 | 76.1 | 83.6 |
| 10 | Prothioconazole + Captan | 0.31 + 1.8 | 60.8 | 78.7 | 82.7 |
| 11 | Prothioconazole + Captan | 0.41 + 1.3 | 66.1 | 79.9 | 84.5 |
| 14 | JOAO ® | 0.8 | 58.4 | 75.8 | 80.4 |
| 15 | JUVENTUS ® + BRAVO ® | 1 + 1 | 64.0 | 72.5 | 88.5 |
| 16 | KANTIK ® | 1.6 | 45.1 | 68.1 | 74.2 |

CONCLUSION

It was observed that all treatments showed good control of disease appeared on leaf. Particularly a combination of captan+prothioconazole showed synergistic efficacy over the solo products. No problem of selectivity was observed during the trial. No effect on non-target organisms was noticed.

The invention claimed is:

1. A method of controlling *Septoria* caused by the pathogen Zymoseptoria *tritici* comprising applying to a cereal plant or plant propagation material thereof the fungicidal composition consisting of captan, optionally mancozeb, optionally a conazole fungicide, and optionally a strobilurin fungicide.

2. The method according to claim 1, wherein said captan is present in an amount of 0.05 to 99% by weight of active compounds in the composition.

3. The method according to claim 2, wherein said captan is present in an amount from 10% to 70% by weight of the composition, and the optional fungicide is present in an amount from 5% to 30% by weight of the composition.

* * * * *